United States Patent
Ensor et al.

(10) Patent No.: US 8,652,229 B2
(45) Date of Patent: *Feb. 18, 2014

(54) PARTICLE FILTER SYSTEM INCORPORATING NANOFIBERS

(75) Inventors: David S. Ensor, Chapel Hill, NC (US);
Howard J. Walls, Apex, NC (US);
Anthony L. Andrady, Apex, NC (US);
Teri A. Walker, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/575,892

(22) Filed: Oct. 8, 2009

(65) Prior Publication Data

US 2010/0031617 A1 Feb. 11, 2010

Related U.S. Application Data

(63) Continuation of application No. 11/559,282, filed on Nov. 13, 2006.

(51) Int. Cl.
*B01D 46/00* (2006.01)
(52) U.S. Cl.
USPC .......... 55/527; 55/486; 55/487; 55/501; 55/528; 55/DIG. 5
(58) Field of Classification Search
USPC .......... 55/486, 487, 501, 502, 514, 527, 528, 55/529; 96/54
See application file for complete search history.

(56) References Cited

U.S. PATENT DOCUMENTS

| 6,656,394 B2 | 12/2003 | Kelly |
| 6,682,576 B1 | 1/2004 | Kiyotani et al. |

(Continued)

FOREIGN PATENT DOCUMENTS

| JP | 59-26511 | 2/1984 |
| JP | 2004-238749 | 8/2004 |

(Continued)

OTHER PUBLICATIONS

Ashrae Standard, "Method of Testing General Ventilation Air-Cleaning Devices for Removal Efficiency By Particle Size", Standard 52.2-1999. American Society of Heating, Refrigerating and Air-Conditioning Engineers, Inc. 1791 Tullie Circle, N.E. Atlanta, pp. 1-47 (pp. 4, 40, 42, and 68 not provided in standard).

(Continued)

*Primary Examiner* — Robert Clemente
(74) *Attorney, Agent, or Firm* — Oblon, Spivak, McClelland, Maier & Neustadt, L.L.P.

(57) ABSTRACT

A filtration device including a filtration medium having a plurality of nanofibers of diameters less than 1 micron formed into a fiber mat in the presence of an abruptly varying electric field. The filtration device includes a support attached to the filtration medium and having openings for fluid flow therethrough. A device for making a filter material. The device includes an electrospinning element configured to electrospin a plurality of fibers from a tip of the electrospinning element, a collector opposed to the electrospinning element configured to collect electrospun fibers on a surface of the collector, and an electric field modulation device configured to abruptly vary an electric field at the collector at least once during electrospinning of the fibers. A method for making a filter material. The method provides a support having openings for fluid flow therethrough, electrospins nanofibers across an entirety of the openings, and abruptly varies an electric field at the collector at least once during electrospinning of the fibers.

18 Claims, 13 Drawing Sheets

(56) References Cited

U.S. PATENT DOCUMENTS

| | | | |
|---|---|---|---|
| 6,858,057 | B2 | 2/2005 | Healey |
| 6,872,311 | B2 | 3/2005 | Koslow |
| 7,115,150 | B2 | 10/2006 | Johnson et al. |
| 7,235,122 | B2 | 6/2007 | Bryner et al. |
| 7,592,277 | B2 | 9/2009 | Andrady et al. |
| 2002/0003209 | A1 | 1/2002 | Wood et al. |
| 2002/0042128 | A1 | 4/2002 | Bowlin et al. |
| 2003/0177909 | A1 | 9/2003 | Koslow |
| 2003/0213218 | A1 | 11/2003 | Dubson |
| 2005/0014252 | A1 | 1/2005 | Chu et al. |
| 2005/0079379 | A1 | 4/2005 | Wadsworth et al. |
| 2005/0113868 | A1 | 5/2005 | Devellian et al. |
| 2005/0121470 | A1 | 6/2005 | Bango et al. |
| 2006/0024599 | A1 | 2/2006 | Jubran et al. |
| 2006/0057350 | A1 | 3/2006 | Ochi et al. |
| 2006/0096260 | A1 | 5/2006 | Bryner et al. |
| 2006/0137317 | A1 | 6/2006 | Bryner et al. |
| 2006/0148066 | A1 | 7/2006 | Senecal et al. |
| 2006/0154063 | A1 | 7/2006 | Fujihara et al. |
| 2006/0226580 | A1 | 10/2006 | Xi et al. |
| 2006/0230731 | A1 | 10/2006 | Kalayci et al. |
| 2007/0074628 | A1 | 4/2007 | Jones et al. |
| 2007/0113530 | A1 | 5/2007 | Morozov et al. |
| 2007/0125700 | A1 | 6/2007 | Ding et al. |
| 2008/0113214 | A1 | 5/2008 | Davis et al. |
| 2008/0150556 | A1 | 6/2008 | Han et al. |

FOREIGN PATENT DOCUMENTS

| | | |
|---|---|---|
| JP | 2005-218909 | 8/2005 |
| JP | 2005-527344 | 9/2005 |
| JP | 2005-536347 | 12/2005 |
| JP | 2006-69141 | 3/2006 |
| JP | 2006-283240 | 10/2006 |
| WO | WO 2006/071979 A1 | 7/2006 |

OTHER PUBLICATIONS

Y.C. Ahn, et al. "Development of High Efficiency Nanofilters Made of Nanofibers", Current Applied Physics, xxx (2005) xxx-xxx, pp. 1-6.

Suresh Dhaniyala et al., "Investigations of Particle Penetration in Fibrous Filters" Part I. Experimental, Journal of the IEST: Jan./Feb. 1999, pp. 32-40.

Suresh Dhaniyala et al., "Investigations of Particle Penetration in Fibrous Filters", Part II. Theoretical, Journal of the IEST: Mar./Apr. 1999, pp. 40-46.

William C. Hinds, "Properties, Behavior, and Measurement of Airborne Particles", Aerosol Technology, New York, John Wiley & Sons, Inc., 1982, pp. 163-186.

Institute of Environmental Sciences and Technology, "Contamination Control Division Recommended Practice 007.1" Testing ULPA Filters, Institute of Environmental Science and Technology, Rolling Meadows, USA, 1992, pp. 1-32.

Institute of Environmental Sciences and Technology, "Contamination Control Division Recommended Practice 021.1", Testing HEPA and ULPA Filter Media, IEST-RP-CC021.1, Rolling Meadows, Ill. 1995, pp. 1-32.

Hongfei Jai, et al., "Enzyme Carrying Polymeric Nanofibers Prepared Via Electrospinning for Use as Unique Biocatalysts", Biotechnol. Prog. 2002, 18, pp. 1027-1032.

Sung Won Choi, et al., "An Electrospun Poly (Vinylidene Fluroide) Nanofibrous Membrane and Its Battery Applications", Advanced Material, 2003, 15, No. 23, Dec. 3, pp. 2027-2032.

Sung-Seen Choi, et al., "Electrospun PVDF Nanofiber Web As Polymer Electrolyte or Separator", Electrochimica Acta 50, 2004, pp. 339-343.

Ulrich Boudriot, et al., "Role of Electrospun Nanofibers in Stem Cell Technologies and Tissue Engineering", Macromol. Symp. 2005, 225, pp. 9-16.

Shanta Raj Bhattarai, et al., "Novel Biodegradable Electrospun Membrane: Scaffold for Tissue Engineering", Biomaterials 25 (2004) pp. 2595-2602.

S. Payet, et al., "Penetration and Pressure Drop of a Hepa Filter During Loading With Sumicron Liquid Particles", 1992, J. Aerosol Sci., vol. 23, No. 7, pp. 723-735.

D. Thomas, at al., "Modelling Pressure Drop in Hepa Filters During Dynamic Filtration", J. Aerosol Sci. vol. 30, No. 2. pp. 235-246, 1999.

Heidi L. Schreuder-Gibson, et al., "Cooperative Charging Effects of Fibers From Electrospinning of Electrically Dissimilar Polymers", INJ Winter 2004, pp. 39-45.

Hyun-Seol Park, et al., "Filtration Properties of Electrospun Ultrafine Fiber Webs", Clean Air Technology Research Center, Korea Institute of Energy Research, Korean J. Chem. Eng. 22(1), 2005, pp. 165-172.

National Institute for Occupational Safety and Health, National Personal Protective Technology Laboratory, Determination of Particulate Filter Penetration to Test Against Solid Particulates for Negative Pressure, Air-Purifying Respirators Standard Testing Procedure (STP), Procedure No. RCT-APR-STP-0057, 0058, 0059, Aug. 24, 2005, pp. 1-11.

National Institute for Occupational Safety and Health, National Personal Protective Technology Laboratory, Determination of Particulate Filter Penetration to Test Against Liquid Particulates for Negative Pressure, Air-Purifying Respirators Standard Testing Procedure (STP), Procedure No. RCT-APR-STP-0051, 0052, 0053, 0054, 0055, 0056, Aug. 24, 2005, pp. 1-11.

Office of the Assistant Secretary of Defense, Washington 25, D.C., "Filter Units, Protective Clothing, Gas-Mask Components and Related Products: Performance Test Methods", May 28, 1956, pp. 1-78.

Myung-Seob Khil, et al., "Electrospun Nanofibrous Polyurethane Membrane as Wound Dressing", 2003 Wiley Perodicals, Inc., pp. 675-679.

El-Refaie Kenawy, et al., Antimicrobial Properties of Modified and Electrospun Poly (Vinyl Phenol), Macromol, Biosci, 2002, 2, pp. 261-266.

Dhirendra S. Katti, et al., "Bioresorbable Nanofiber-Based Systems for Wound Healing and Drug Delivery: Optimization of Fabrication Parameters", Published online May 10, 2004 in Wiley InterScience (www.interscience.wiley.com) DOI: 10.1002/jbm.b.30041 pp. 286-296.

Hongfei Jia, et al., "Enzyme-Carrying Polymeric Nanofibers Prepared Via Electrospinning for Use as Unique Biocatalysts", Biotechnol, Prog. 2002, 18, pp. 1027-1032.

Zheng-Ming Huang, et al., "A Review on Polymer Nanofibers by Electrospinning and Their Applications in Nanocomposites", Composites Science and Technology 63 (2003), pp. 2223-2253.

Mustafa M. Demir, et al., "Palladium Nanoparticles by Electrospinning From Poly (Acrylonitrile-Co-Acrylic Acid) —$PdCl_2$ Solutions. Relations Between Preparation Conditions, Particle Size, and Catalytic Activity", Macromolecules 2004, 37, pp. 1787-1792.

Bin Ding, et al., "Electrospun Fibrous Polyacrylic Acid Membrane-Based Gas Sensors", Sensors and Actuators B 106 (2005), pp. 477-483.

Ioannis S. Chronakis, "Novel Nanocomposites and Nanoceramics Based on Polymer Nanofibers Using Electrospinning Process—A Review", Journal of Materials Processing Technology 167 (2005), pp. 283-293.

D. Aussawasathien, et al., "Electrospun Polymer Nanofiber Sensors", Synthetic Metals 154, (2004), pp. 37-40.

Yanzhong Zhang, et al., "Recent Development of Polymer Nanofibers for Biomedical and Biotechnological Applications", Journal of Materials Science: Materials in Medicine 16 (2005), pp. 933-946.

Haiqing Liu, et al., "Electrospun Polymer Nanofibers as Subwavelength Optical Waveguides Incorporating Quantum Dots", Wiley InterScience, Small 2006, 2, No. 4, pp. 495-499.

Jing Zeng, et al., "Biodegradable Electrospun Fibers for Drug Delivery", Journal of Controlled Release 92 (2003) pp. 227-231.

Maria Spasova, et al., "Preparation of Chitosan-Containing Nanofibres by Electrospinning of Chitosan/Poly (Ethylene Oxide) Blend Solutions", e-Polymers 2004, No. 056, pp. 1-12.

(56) References Cited

OTHER PUBLICATIONS

Ramalingam Murugan, Ph.D., et al., "Nano-Featured Scaffolds for Tissue Engineering: A Review of Spinning Methodologies", Tissue Engineering, vol. 12, No. 3, 2006, pp. 435-449.

Zuwei Ma, Ph.D., et al., "Potential of Nanofiber Matrix as Tissue-Engineering Scaffolds", Tissue Engineering, vol. 11, No. ½, 2005, Mary Ann Liebert, Inc., pp. 101-109.

Emma Luong-Van, et al., Controlled Release of Heparin From Poly (ε-Carolactone) Electrospun Fibers, Biomaterials 27 (2006), pp. 2042-2050.

Haiquing Liu, et al., "Polymeric Nanowire Chemical Sensor", Nano Letters, 2004 vol. 4, No. 4, pp. 671-675.

U.S. Appl. No. 13/211,940, filed Aug. 17, 2011, Ensor, et al.

U.S. Appl. No. 13/243,257, filed Sep. 23, 2011, Ensor, et al.

U.S. Appl. No. 13/243,400, filed Sep. 23, 2011, Andrady, et al.

Examination Report issued on Mar. 8, 2011 in British Patent Application No. GB 0906387.6.

Chinese Office Action issued on Jun. 20, 2011 in corresponding Chinese Application No. 200780042131.4 (English Translation Only).

United Kingdom Search and Examination Report issued on Jun. 24, 2011 in corresponding United Kingdom Application No. GB 0906387.6.

Office Action issued for the Republic of China dated September 14, 2010, Patent Application No. 200780042131.4.

U.S. Appl. No. 12/992,108, filed Nov. 11, 2010, Walls, et al.

Office Action issued for the United Kingdom dated Oct. 27, 2010, Patent Application No. GB0906387.6.

Office Action issued Jun. 26, 2012 in Japanese Application No. 2009-536438 (With English Translation).

Office Action issued Apr. 2, 2013 in Japanese Application No. 2009-536438 (With English Translation).

PARTICLE FILTER SYSTEM INCORPORATING NANOFIBERS

CROSS REFERENCE TO RELATED APPLICATIONS

This application is a continuation of U.S. application Ser. No. 11/559,282, filed Nov. 13, 2006, the entire contents of which are incorporated herein by reference. This application is related to U.S. application Ser. No. 10/819,916, filed on Apr. 8, 2004, entitled "Electrospinning of Polymer Nanofibers Using a Rotating Spray Head," the entire contents of which are incorporated herein by reference. U.S. application Ser. No. 11/559,282, filed Nov. 13, 2006, is also related to U.S. application Ser. No. 10/819,942, filed on Apr. 8, 2004, entitled "Electrospray/electrospinning Apparatus and Method," the entire contents of which are incorporated herein by reference. U.S. application Ser. No. 11/559,282, filed Nov. 13, 2006, is related to U.S. application Ser. No. 10/819,945, filed Apr. 8, 2004, entitled "Electrospinning in a Controlled Gaseous Environment," the entire contents of which are incorporated herein by reference. U.S. application Ser. No. 11/559,282, filed Nov. 13, 2006, is related to U.S. Ser. No. 11/130,269, filed May 17, 2005 entitled "Nanofiber Mats and Production Methods Thereof," the entire contents of which are incorporated herein by reference.

BACKGROUND OF THE INVENTION

1. Field of the Invention

The present invention is related to nanofibers, methods and devices for electrospinning, methods and devices for depositing the nanofibers, and filters and other articles formed from the deposited nanofibers.

2. Description of the Related Art

The filtration industry has traditionally manufactured particulate air filters using conventional medium such as glass, cotton or polymer fibers made provided as rolled goods. The fibrous media may be made by non-woven processes such as wet laid paper, melt blown-spinning or woven yarn. The material is then transported to equipment where the media is cut, pleated, supported, glued into filter frames, and tested for leaks. Various measures of the properties of the rolled goods include appropriate weight per unit area, porosity, etc.

The porous filter media may be pleated or bonded into bags to increase the area of the media within individual filter units to reduce pressure drop. Often screens and other supports are added to prevent collapse of the media from the force of air flowing through the filter unit as dust is collected. Depending on the intended use of the filter, the filter may be tested with an appropriate challenge aerosol at a rated or standard airflow rate for pressure drop and particle collection efficiency. (e.g., ASHRAE 52.2, MIL-STD-282, IEST RP-CC 007.1, NIOSH APRS-STP-0051-00, and NIOSH APRS-0057-00 may be used to test the filters)

Theoretically, a reduction of the diameter of the fibers in a filter has the potential of causing an improvement of the filter system performance. For high efficiency filtration, fiberglass wet-laid papers are widely used having fiber diameters in the 200 nm to 5000 nm size range with the fiber sizes intentionally blended for both durability and filtration performance.

One technique for producing a smaller fiber diameter, and hence a potential for generating improved filtration media, is electrospinning of polymers to make submicron and nanofibers. Electrospinning as currently practiced uses a constant voltage to drive the spinning process defined herein as static field electrospinning.

However, electrospun nanofibers smaller than 500 nm are typically fragile, difficult to produce, and difficult to handle. One conventional approach has been to deposit nanofibers onto a conventional porous filter media to make a layered nanofiber filter media. The following patents describe conventional ways to fabricate nanofiber containing filters for various applications: U.S. Pat. Nos. 7,008,465; 6,994,742; 6,974,490; 6,955,775; 6,924,028; 6,875,256; 6,875,249; 6,800,117; 6,746,517; 6,743,273; 6,740,142; 6,716,274; and 6,673,136, and U.S. patent application Ser. Nos. 10/757,924 and 10/676,185; the entire contents of each of these patents are incorporated in entirety herein by reference.

Conventional layered nanofiber filters made from nanofibers deposited on conventional porous filter media have inherent limitations. The support media of these filters is usually pliable enough to allow pleating or manipulation during the assembly step. Such a pliable substrate media may flex or stretch from the air pressure drop force and may break or debond the nanofibers. The support layer of conventional media may contribute substantially to the pressure drop of the whole structure.

An ideal particulate filter is the one that would give the highest particle collection efficiency (lowest particle penetration) with the least pressure drop. One criterion for comparing filters of different thickness is the filter quality factor or figure of merit (FoM). The greater the value of FoM, the better the filter will perform (Hinds, 1982). One expression for this parameter is given by:

$$FoM = -\mathrm{Log}(Pt)/\Delta P \qquad (1)$$

where: Pt is the fractional penetration of a specific aerosol particle diameter (efficiency=(1−Pt)), and $\Delta P$ is the pressure drop corresponding to a specific face velocity of the filter (volumetric air flow divided by filter cross sectional area). As used herein, figure of merit given by $-\mathrm{Log}(Pt)/\Delta P$, where Pt is the fractional penetration of a specific aerosol particle diameter and $\Delta P$ is a pressure drop across the filtration medium corresponding to a face velocity of 5.3 cm/s and particle size of 0.3 microns.

Typically, the FoM of a high efficiency particulate air (HEPA) glass fiber media is 12 $kPa^{-1}$ measured at a face velocity of 5.33 cm/s and 0.3 μm particle diameter. These are the standard conditions for HEPA media tests (i.e., IEST-RP-CC021.1).

The FoM of the layered nanofiber conventional porous filter media described above is limited by the relatively large fiber diameters of the coarse substrate which produce a relatively low FoM. The FoM of the layered nanofiber conventional porous filter media composite depends on the relative quantities of layers of nanofibers and conventional media and their respective FoM. In other words, while the individual layers of nanofibers may have a higher FoM than the conventional porous filter media substrate, the composite FoM is closer to the value of the convention porous filter media substrate because of the relative quantities of materials used in the conventional approach. Therefore at the current state-of-the-art, conventional layered nanofiber filter media do not provide filters with significantly greater FoM than conventional fiberglass media.

References describing various background materials and filter testing procedures include:

1. ASHRAE (1999) Method of Testing General Ventilation Air-Cleaning Devices for Removal Efficiency by Particle Size, Standard 52.2-1999. American Society of Heating, Refrigerating and Air-Conditioning Engineers, Inc. 1791 Tullie Circle, N. E. Atlanta, USA.

2. Ahn, Y. C., S. K. Park, et al. (2005). "Development of high efficiency nanofilters made of nanofibers." Current Applied Physics: In press (accessed online).

3. Dhaniyala, S. and B. Y. H. Liu (1999a). "Investigations of particle penetration in fibrous filters part I. Experimental." Journal of the IEST 42(1): 32-40.

4. Dhaniyala, S. and B. Y. H. Liu (1999b). "Investigations of particle penetration in fibrous filters Part II. Theoretical." Journal of the IEST 42(2): 40-46.

5. Hinds, W. C. (1982). Aerosol Technology. New York, John Wiley & Sons, Inc.

6. IEST (1992) Institute of Environmental Sciences, Testing ULPA Filters. IEST RP-CC 007.1 Institute of Environmental Science and Technology, Rolling Meadows, USA.

7. IEST (1995) Institute of Environmental Sciences and Technology (1995) Testing HEPA and ULPA Filter Media, IEST-RP-CC021.1, Rolling Meadows, Ill.

8. MIL-STD-282, Filter units, Protective Clothing, Gasmask Components and Related Products: Performance Test Methods, US Government Printing Office, May 28, 1956.

9. National Institute for Occupational Safety and Health (NIOSH) Particulate Filter Penetration Procedure to Test Negative Pressure Respirators against Liquid Particulates (Procedure APRS-STP-0051-00) Morgantown, W. Va.: NIOSH Division of Safety Research, 1955.

10. National Institute for Occupational Safety and Health (NIOSH) Particulate Filter Penetration Procedure to Test Negative Pressure Respirators against Solid Particulates (Procedure APRS-STP-0057-00) Morgantown, W. Va.: NIOSH Division of Safety Research, 1955.

11. Park, H. S. and Y. O. Park (2005). "Filtration properties of electrospun utrafine fiber webs." Korean Journal of Chemical Engineering 22(1): 165-172.

12. Schreuder-Gibson, H. L., P. Gibson, et al. (2004). "Cooperative charging effects of fibers from electrospinning of electrically dissimilar polymers." International Nonwovens Journal 13(4): 39-45.

13. Thomas, D., P. Contal, V. Renaudin, P. Penicot, D. Leclerc and J. Vendel (1999) Modelling pressure drop in HEPA filters during dynamic filtration. J. Aerosol Science, 30(2) 235-246.

14. S. Payet, D. Boulaud, G. Madelaine and A. Renoux (1992) Penetration and pressure drop of a HEPA filter during loading with submicron liquid particles. J. Aerosol Science 23(7). 723-735.

15. Bhattarai, S. R., N. Bhattarai, et al. (2004). "Novel biodegradable electrospun membrane: scaffold for tissue engineering." Biomaterials 25(13): 2595-2602.

16. Boudriot, U., B. Goetz, et al. (2005). "Role of electrospun nanofibers in stem cell technologies and tissue engineering." Macromolecular Symposia 225: 9-16.

17. Choi, S. S., Y. S. Lee, et al. (2004). "Electrospun PVDF nanofiber web as polymer electrolyte or separator." Electrochimica Acta 50(2-3): 339-343.

18. Choi, S. W., S. M. Jo, et al. (2003). "An electrospun poly(vinylidene fluoride) nanofibrous membrane and its battery applications." Advanced Materials 15(23): 2027-2032.

19. Jia, H. F., G. Y. Zhu, et al. (2002). "Enzyme-carrying polymeric nanofibers prepared via electrospinning for use as unique biocatalysts." Biotechnology Progress 18(5): 1027-1032.

20. Liu, H. Q., J. B. Edel, et al. (2006). "Electrospun polymer nanofibers as subwavelength optical waveguides incorporating quantum dots." Small 2(4): 495-499.

21. Zhang, Y. Z., C. T. Lim, et al. (2005). "Recent development of polymer nanofibers for biomedical and biotechnological applications." Journal of Materials Science-Materials in Medicine 16(10): 933-946.

22. Aussawasathien, D., J. H. Dong, et al. (2005). "Electrospun polymer nanofiber sensors." Synthetic Metals 154(1-3): 37-40.

23. Chronakis, I. S. (2005). "Novel nanocomposites and nanoceramics based on polymer nanofibers using electrospinning process—A review." Journal of Materials Processing Technology 167(2-3): 283-293.

24. Demir, M. M., M. A. Gulgun, et al. (2004). "Palladium nanoparticles by electrospinning from poly(acrylonitrile-co-acrylic acid)-PdCl2 solutions. Relations between preparation conditions, particle size, and catalytic activity." Macromolecules 37(5): 1787-1792.

25. Ding, B., M. Yamazaki, et al. (2005). "Electrospun fibrous polyacrylic acid membrane-based gas sensors." Sensors and Actuators B-Chemical 106(1): 477-483.

26. Huang, Z. M., Y. Z. Zhang, et al. (2003). "A review on polymer nanofibers by electrospinning and their applications in nanocomposites." Composites Science and Technology 63(15): 2223-2253.

27. Jia, H. F., G. Y. Zhu, et al. (2002). "Enzyme-carrying polymeric nanofibers prepared via electrospinning for use as unique biocatalysts." Biotechnology Progress 18(5): 1027-1032.

28. Katti, D. S., K. W. Robinson, et al. (2004). "Bioresorbable nanofiber-based systems for wound healing and drug delivery: Optimization of fabrication parameters." Journal of Biomedical Materials Research Part B-Applied Biomaterials 70B(2): 286-296.

29. Kenawy, E. R. and Y. R. Abdel-Fattah (2002). "Antimicrobial properties of modified and electrospun poly(vinyl phenol)." Macromolecular Bioscience 2(6): 261-266.

30. Khil, M. S., D. I. Cha, et al. (2003). "Electrospun nanofibrous polyurethane membrane as wound dressing." Journal of Biomedical Materials Research Part B-Applied Biomaterials 67B(2): 675-679.

31. Liu, H. Q., J. Kameoka, et al. (2004). "Polymeric nanowire chemical sensor." Nano Letters 4(4): 671-675.

32. Luong-Van, E., L. Grondahl, et al. (2006). "Controlled release of heparin from poly(epsilon-caprolactone) electrospun fibers." Biomaterials 27(9): 2042-2050.

33. Ma, Z. W., M. Kotaki, et al. (2005). "Potential of nanofiber matrix as tissue-engineering scaffolds." @Tissue Engineering 11(1-2): 101-109.

34. Murugan, R. and S. Ramakrishna (2006). "Nano-featured scaffolds for tissue engineering: A review of spinning methodologies." Tissue Engineering 12(3): 435-447.

35. Spasova, M., N. Manolova, et al. (2004). "Preparation of chitosan-containing nanofibres by electrospinning of chitosan/poly(ethylene oxide) blend solutions." E-Polymers.

36. Zeng, J., X. Y. Xu, et al. (2003). "Biodegradable electrospun fibers for drug delivery." Journal of Controlled Release 92(3): 227-231.

The entire contents of these references are incorporate herein by reference.

SUMMARY OF THE INVENTION

In one embodiment of the present invention, there is provided a filtration device including a filtration medium having a plurality of nanofibers of diameters less than 1 micron formed into a fiber mat in the presence of an abruptly varying electric field. The filtration device includes a support attached to the filtration medium and having openings for fluid flow therethrough.

In one embodiment of the present invention, there is provided a filtration device including a support having openings for fluid flow therethrough. The filtration device includes a filtration medium having a plurality of fibers attached to the support. The filtration medium has a figure of merit greater than 20 $kPa^{-1}$, where the figure of merit is given by $-Log (Pt)/\Delta P$, where Pt is the fractional penetration of a specific aerosol particle diameter and $\Delta P$ is a pressure drop across the filtration medium corresponding to a face velocity of 5.3 cm/s and particle size of 0.3 microns.

In one embodiment of the present invention, there is provided a device for making a filter material. The device includes an electrospinning element configured to electrospin a plurality of fibers from a tip of the electrospinning element, a collector opposed to the electrospinning element configured to collect electrospun fibers on a surface of the collector, and an electric field modulation device configured to abruptly vary an electric field at the collector at least once during electrospinning of the fibers.

In one embodiment of the present invention, there is provided a method for forming a filter material. The method includes providing a support having openings for fluid flow therethrough, electrospinning nanofibers across an entirety of the openings, and abruptly varying an electric field at the collector at least once during electrospinning of the fibers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The present invention provides for fabrication of nanofiber mats that could be used, for example, but not limited to filtration applications. The present invention can be applied to a wide range of other areas such as single filaments, yarns, nonwoven materials and membranes. Marked improvements in filter performance, as indicated by FoM, are provided for in various embodiments of the present invention.

In one embodiment of the present invention, a dynamic field electrospinning technique is used to produce the various articles defined herein and/or used in applications including filaments, yarns, nonwovens, and membranes. The present invention utilizing the dynamic field electrospinning is particularly applicable to the field of filtration utilizing nanofiber based materials, especially nanofiber based filters. The morphology of the resultant nanofiber mat coupled with the lack of use of nonwoven filter media to support the nanofibers affect the resultant filter FoM. Other aspects provided by the present invention include: (1) filters, filter devices, or filter materials with lower pressure drop and/or better filtration efficiency reflected in an improved filter FoM, (2) reduction in the most penetrating particle size, (3) methods for fabricating filters, filter devices, or filter materials, and (4) methods for improved process monitoring and control during fabrication of nanofiber mats.

Figure 1A:
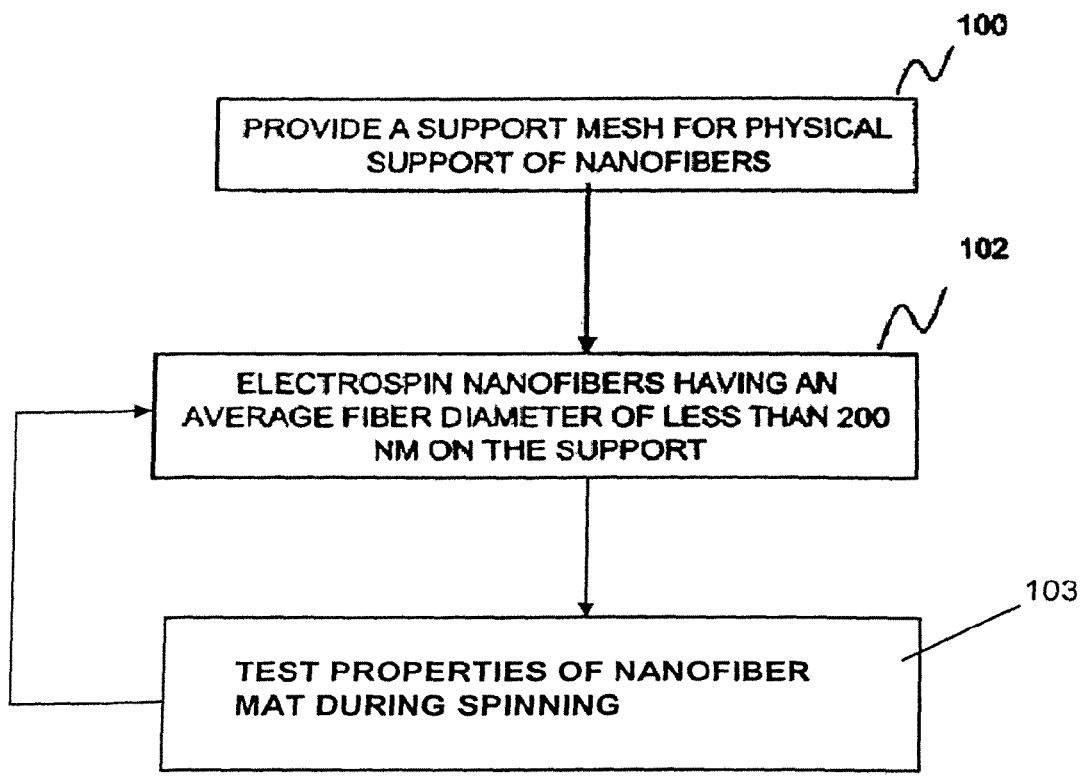
FIG. 1A is a flow chart showing a method according to one embodiment of the present invention for producing a nanofiber based filter.
Figure 1B:
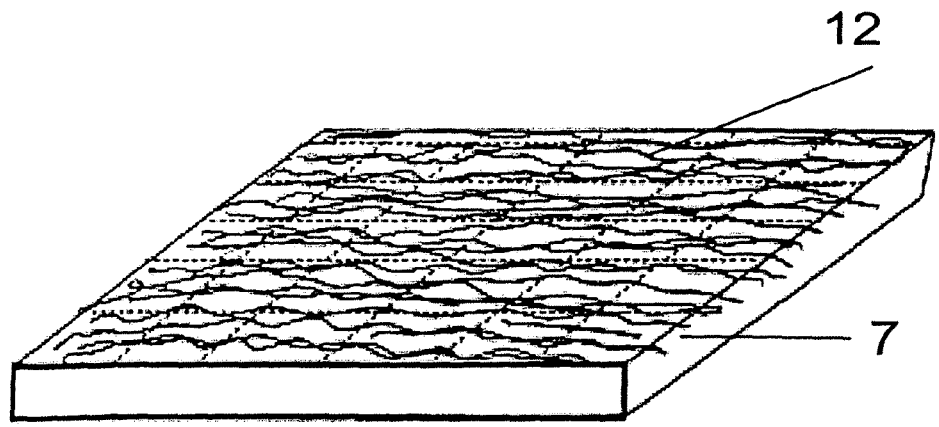
FIG. 1B is a schematic according to one embodiment of the present invention for a nanofiber based filter.
Figure 4:
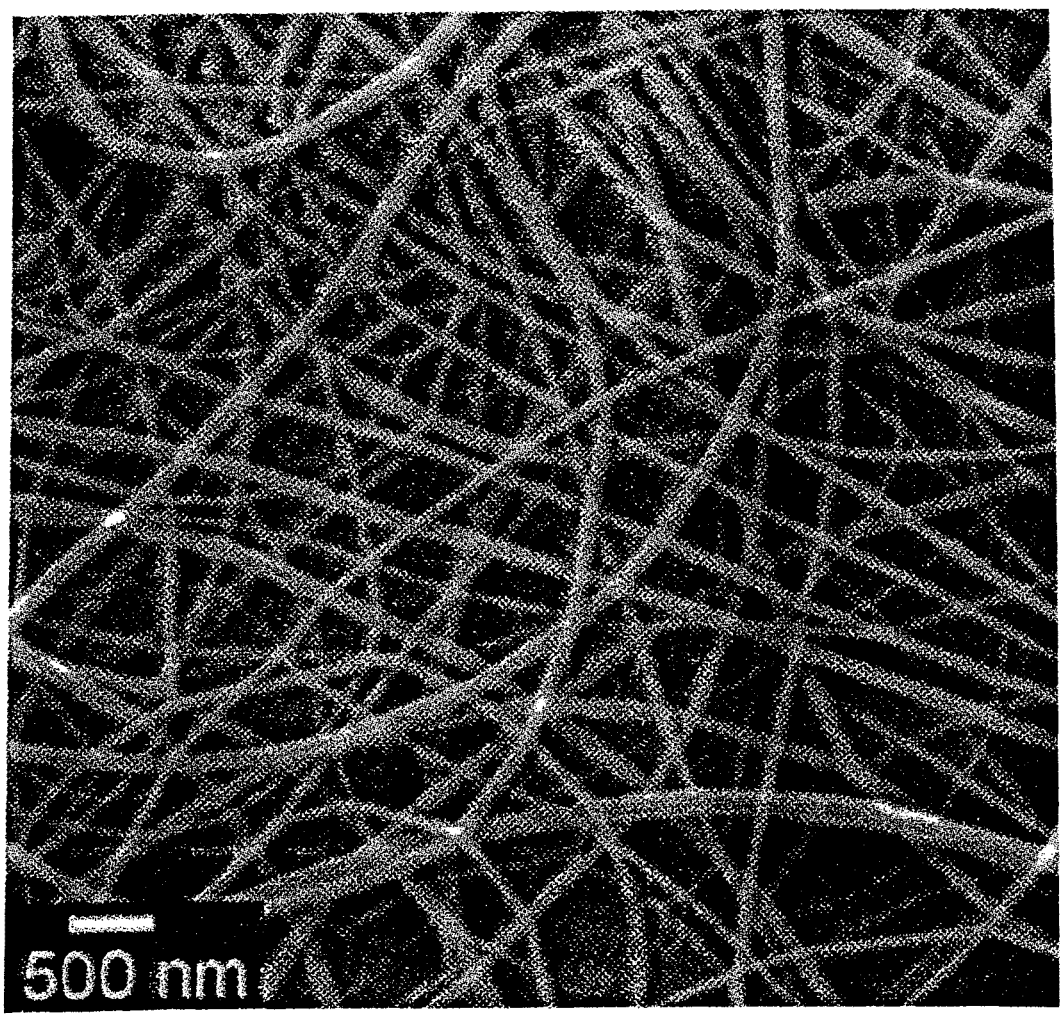
FIG. 4 is a micrograph displaying the type of nanofiber morphology obtained using techniques described in the invention.

Referring now to the drawings, wherein like reference numerals designate identical or corresponding parts throughout the several views, FIG. 1A is a flow chart showing a method according to one specific embodiment of the present invention for producing a nanofiber based filter material. Moreover, FIG. 1B is a schematic according to one embodiment of the present invention for a nanofiber based filter in which a support mesh 7 supports to a uniform depth a plurality of nanofibers 12. For the sake of clarity, only a few layers of fibers are shown, and as shown the fibers are fairly oriented. The present invention can utilize thicker fiber mats (i.e., more layers), and while techniques exist to orient the fibers, the orientation of the fibers is not necessary, as shown in FIG. 4. As shown in FIG. 1A, at 100, a support mesh is provided for physical support. At 102, nanofibers having an average fiber diameter (AFD) of 200 nm or less are electrospun onto the support mesh. At 103, the filter mat performance is measured by a number of methods including pressure drop, aerosol penetration and laser light scattering to allow for monitoring and controlling of the process.

At 102, in one embodiment of the present invention, the nanofibers are electrospun under the conditions in which an enclosure permits control of the electrospinning environment through aspects such as $CO_2$ purging of the electrospinning environment, control of the relative humidity, and control of solvent vapor pressure.

Further details of the processes used in the present invention at 100, 102, and 103 are described below in the various embodiments disclosed.

Figure 2A:
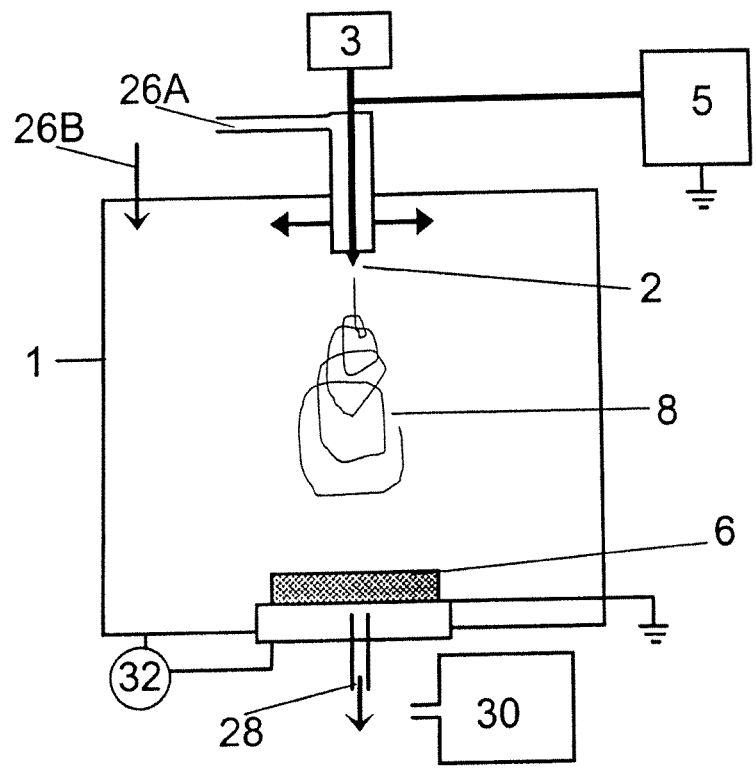
FIG. 2A is a schematic diagram showing according to one embodiment of the present invention an apparatus for electrospinning in a controlled environment.
Figure 2B:
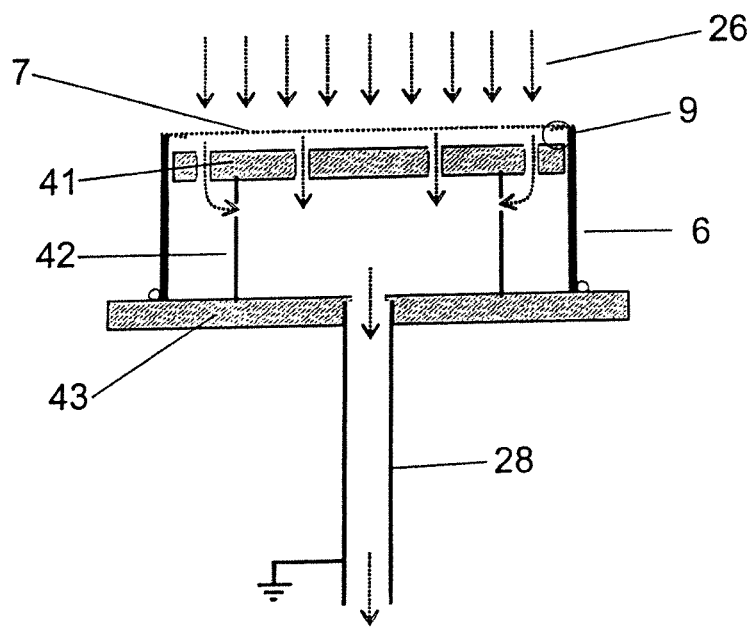
FIG. 2B is a schematic diagram showing according to one embodiment of the present invention details of a device called dynamic field electrospinning for controlling deposition of the nanofibers.

One example of the formation of an electrospun nanofiber filter using several aspects of the invention is depicted in FIGS. 2A and 2B. Fabrication of the nanofiber filter is, in one embodiment of the present invention, carried out in an enclosed and environmentally controlled chamber 1. An electrically insulating filter frame 6 with a coarse support mesh 7 (secondary electrode) is placed on a filter assembly holder 41-43. Completing the circuit is a ground electrode 43 which is connected to ground by a conducting tube 28. The mesh 7 functioning as support for the electrospun materials has macroscopic openings that in one non-limiting example are about 1.4 mm by 1.4 mm and that contributes minimally to the pressure drop across the filter, yet provides structural support for the nanofibers. The mesh in this example is made from wires having a diameter of 0.1 mm. Carbon dioxide $CO_2$ process gas 26 is introduced into the chamber 1 with the humidity of the chamber controlled to between 20% and 40% RH using a mixture of dried $CO_2$ and humidified $CO_2$. A polymer solution (e.g., 21 wt % polysulfone in solvent dimethylacetamide) from reservoir 3 flows to electrospinning emitter/orifice 2, which is connected to high voltage power supply 5. An electric field present at the end of the orifice 2 extracts the polymer solution from the orifice forming fibers of the polymer solution.

The structure of the electric fields between the emitter 2 (powered by supply 5) and ground, which drives fiber deposition, are controlled, in part, by the design of the filter frame holder 41-43. Furthermore, the potential of the support mesh 7 is controlled by an electric field pulsation device 9 (i.e., a voltage limiter or discharge device or an electric field applicator device). The electric field pulsation device 9 is configured to pulse an electric field at the collector at least once (or frequently) during electrospinning of the fibers to discharge charge accumulated on the electrospun fibers.

Figure 3:
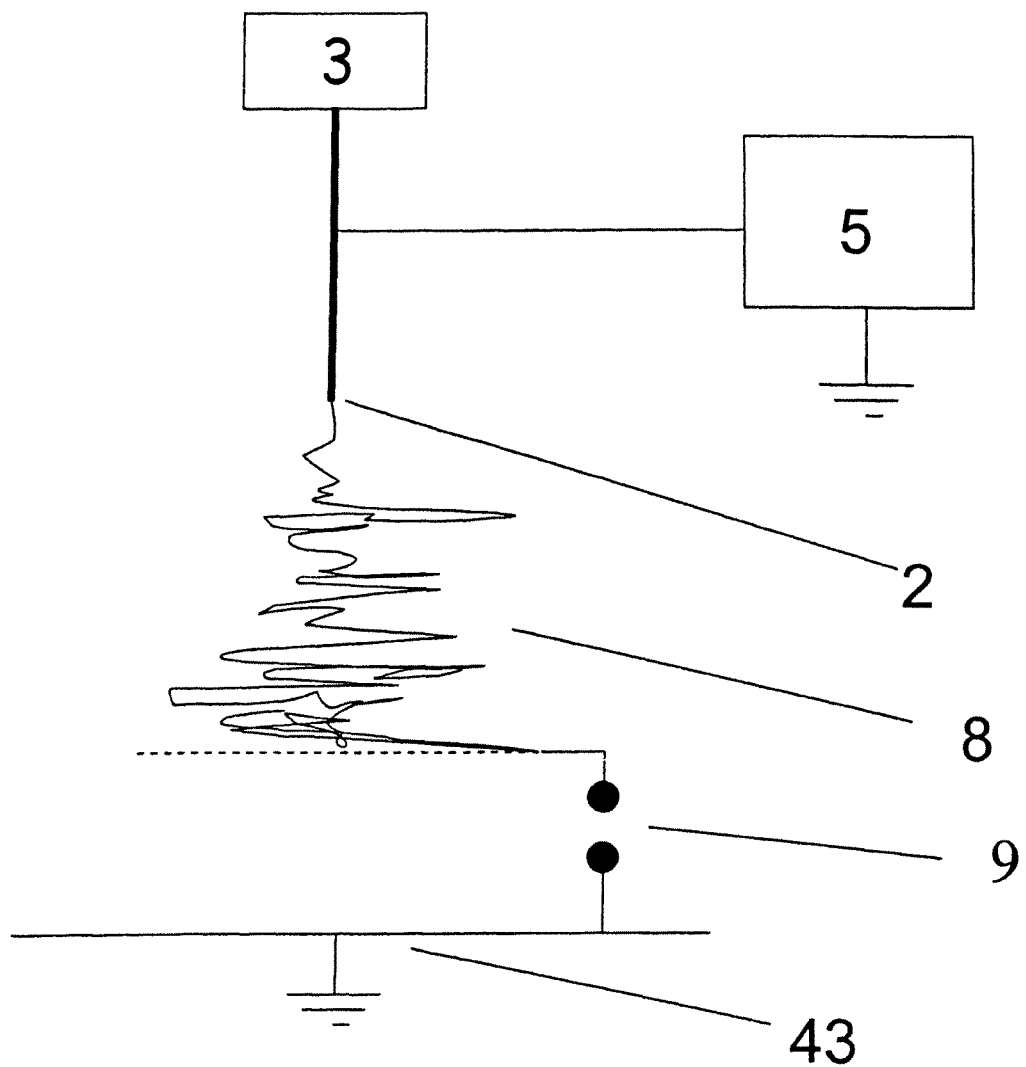
FIG. 3 is an electrical schematic of the dynamic field electrospinning device.
Figure 6:
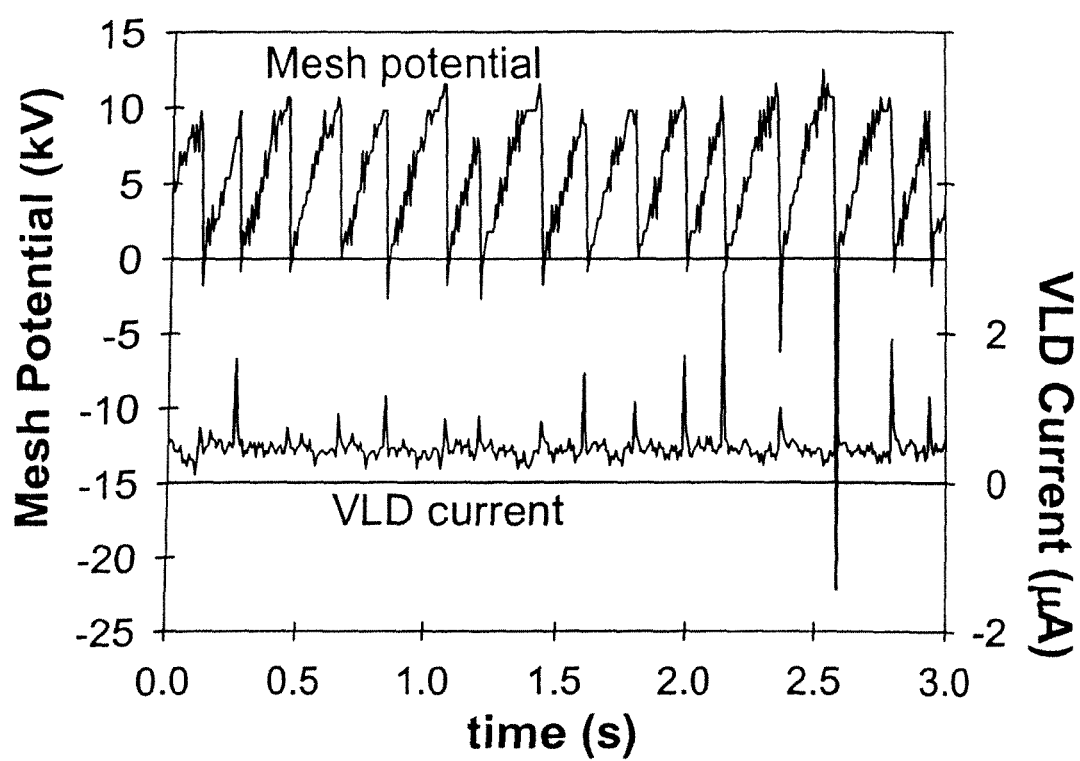
FIG. 6 is data of the support mesh (secondary electrode) time varying potential and corresponding current flowing through a voltage limiting device (VLD) associated with the support mesh illustrating one element of dynamic field electrospinning.

An electrical schematic of the electrospinning circuit is shown in FIG. 3. The electrospun fibers 8 carry charge to the mesh (i.e., the secondary electrode 7) which is discharged frequently to the grounded primary electrode 43 by the voltage limiter device 9 acting in this example as an electric filed pulsation device. The circuit in FIG. 3 utilizes dynamic field electrospinning where the time varying voltage shown in FIG. 6 is present on the secondary electrode or collector 7. The resultant electric field in one embodiment of the present invention is oriented in the direction of the spinning fibers and dynamically modifies the structure of the electric field, thereby according to the present invention imparting improved fiber and mat properties (as measured by the FoM of the mat) as compared to the static field electrospinning conventionally used in which collector 7 would for example be grounded (as discussed below).

In one embodiment of the present invention, a jacket of $CO_2$ gas 26A flows over emitter 2. A jet of polymer fibers 8 is formed that travels towards the filter assembly and holder. The polysulfone PSu fibers electrospun onto coarse mesh 7 typically have an average fiber diameter of less than 200 nm. The filter mat 12 formed by the nanofibers can be about 3 μm thick, therefore containing on the order of 5-20 nanofiber layers. At least part of the process gas flows through the filter mat during the deposition process.

In one embodiment of the present invention, the pressure drop across the forming nanofiber filter can be monitored real-time during fabrication using a differential pressure gage 32. Many factors affect the resultant filter performance. Some of these factors are: obtaining a suitably small nanofiber size, a suitable nanofiber mat morphology, and a filter frame+ nanofiber mat construct that provides rigidity to the resultant composite so that the support structure does not limit the pressure drop.

Spinning Suitable Nanofibers

Static field electrospinning as a technique to produce fine polymer fibers is well known. In its simplest form, a hollow orifice with a flowing polymer solution is connected to a high-voltage (AC or DC) power supply that is typically controlled at a constant voltage. The voltage gradient pulls the fluid from the orifice (or spinneret) into a fluid filament. As the polymer solution dries, charges on the surface of the polymer repel each other, stretching the fiber and causing a whipping motion resulting in a significant reduction in fiber diameter. The fibers are collected as a mat on a grounded electrode surface. The process is complex, with competing forces between the self-repulsion of the like-charged fibers and the applied external electric fields.

A wide range of polymers have been electrospun including polycarbonate, polyamides, polystyrene, and polysulfone as a few examples. For instance, polysulfone (Psu), $M_w$~35,000 g/mol, can be spun from a 21 wt % solution in N,N-dimethylacetamide (DMAc), and polycarbonate, $M_w$~60,000 g/mol, can be spun from a 15 wt % solution of polymer in a 50/50 solution of tetrahydrofuran (THF) and N,N-dimethyl formamide (DMF).

U.S. Pat. Appl. Publ. No. (2005/0224999), the entire contents of which are incorporated herein by reference, describes the use of an electronegative gas to facilitate the electrospinning process by the introduction, for example, of carbon dioxide ($CO_2$) around the spinning orifice or emitter. Gases such as CO, $CF_4$, $N_2O$, $CCl_4$, $CCl_3F$, $CCl_2F_2$ and other halogenated gases can be introduced into the electrospinning environment at 26A and/or 26B. The electronegative process gas stabilizes the Taylor cone formed by the polymer jet as it comes off the needle, reduces corona discharge at the needle, and reduces fiber diameter. Furthermore, spinning in a controlled environment ensures less contamination of the fibers, improves safety, and adds another dimension of control parameters that can be used to fine-tune fiber formation.

In one embodiment of the present invention, an electronegative gas 26A flows coaxially with the spinning needle along with use of a controlled gas environment. Typically, a gas shroud is used to provide the coaxial gas flow. A typical shroud used in the present invention can be in the shape of an annulus having an outside radius of about 0.48 cm and an inside radius of about 0.40 cm. A variety of geometries and sizes are possible; such as for example a circular outside with a hexagonal inside being an additional geometry. In the annular geometry, a distance from an exit end of the annulus where gas is emitted to the tip of the electrospinning element can range from flush (0 cm) to 8 cm; with a typical distance being around 4 to 5 cm, and with the distance being 4.7 cm for the detailed examples later.

In one embodiment of the present invention, control of the electrospinning conditions has produced polymer nanofibers with an average fiber diameter AFD of 100 nm and less. Nanofibers less than 200 nm have been found to improve the filtration properties of the resultant fiber when combined with other elements of the present invention.

In one embodiment of the present invention, additives in the polymer solution can make a substantial difference in fiber size and quality. Addition of trace amounts of a salt or a surfactant increases the solution conductivity and hence the charge accumulation at the tip of the electrospinning element resulting in larger stretching forces applied to the forming fiber, hence smaller diameter fibers. The surfactant also reduces the surface tension of the polymer allowing for even smaller fibers to be spun. Lithium salts, (for example, lithium chloride and lithium triflate) or surfactants such as tetra butyl ammonium chloride (TBAC) are suitable for the present invention. Lithium salt concentrations from 0.01 to 3 wt % are suitable for the present invention. Concentrations of TBAC of between 0.06 and 0.4 wt %, were exemplary, although other concentrations are suitable.

In one embodiment of the present invention, polymer concentration in the electrospinning solution impacts the quality of the electrospun fibers. Concentrations from 17 wt % to 30 wt % for the molecular weight of PSu are suitable for the present invention with around 21 wt % typically being ideal.

In one demonstration of the present invention, Udel P3500 LCD PSu made by Solvay Advanced Polymers was used. The molecular weight is in the range of 22,000 to 36,000 g/mol. Molecular weight is understood as an important component in formulating the polymer solution. The P3500 LCD contains few cyclic dimmers and is suitable for many of the applications described herein. However, the present invention is only exemplified by this polymer and its characteristics, and is not restricted to this particular polymer.

In one embodiment of the present invention, stainless steel extrusion tips from 0.15 mm to 0.59 mm internal diameters (ID) are suitable for the present invention. Larger and smaller diameters may also be used. In another embodiment of the present invention, Teflon™ capillary tubes with ID from 0.076 mm to 0.31 mm are suitable for the present invention. Larger and smaller diameters may also be used. Both types of orifices can produce small fibers. For both orifices, low flow rates of the polymer solution (e.g., 0.05 ml/hr) coupled with high voltage drops typically resulted in the smallest fiber diameters (e.g., AFD less than 100 nm). In both cases, the voltage was set to 22 kV to 30 kV for a 17.8 cm to 25.4 cm gap (i.e., distance between emitter 2 and mesh 7). Of note is that the voltage per electrospinning-gap is one parameter determining the pulling strength; this gap also determines a travel time thus partly determining fiber stretching time.

Besides stainless steel and Teflon™ extrusion tips, in the present invention, other materials (provided the materials are non-reactive with the substance being electrospun including any solvent used in the electrospinning process) can be used such as for example polymers, glass, ceramic, or metal extrusion tips.

There also exists an effect of $CO_2$ flow rate (26A, gas jacket flow around and over the spinning orifice in the fiber direction) for the different spinning orifices. When stainless steel needles were used, higher gas flow rates (e.g., increasing from 8 lpm to 13 lpm) typically resulted in improved fibers with smaller diameters. In contrast, when polytetrafluoroethylene (i.e., Teflon™) capillary tubes were used, the fiber quality was typically degraded with increasing $CO_2$ flow rate from 8 lpm to 13 lpm. It is likely that there is an optimum $CO_2$ flow rate where that optimum is lower for the Teflon™ capillary than for the stainless steel needle. The optimum for use with the Teflon™ capillary is about 8 lpm where a higher flow rate is optimum for the stainless steel capillary.

Although a smaller fiber is obtained at 13 lpm versus 8 lpm for stainless steel orifices, the higher $CO_2$ flow rate negatively impacted the nanofiber mat morphology for PSu fibers. That is, a PSu nanofiber mat formed at 13 lpm did not perform as well as those produced at 8 lpm. The values for electronegative gas flow rates (in this case $CO_2$) given here are only examples, other gas flow rates may be used given the combination of factors disclosed herein effecting the resultant nanofiber filter mat (e.g., electrospinning orifice, polymer formulation, support mesh, and electrospinning conditions). Other embodiments of the present invention use jacket gas 26A flow rates from 0 to 30 lpm. Additionally, the total flow of process gases 26 can be from 0 to 300 lpm or beyond.

In one embodiment of the present invention, the relative humidity RH of the electrospinning chamber effects fiber morphology. For example, when using 21 wt % PSu ($M_w$~35,000 g/mol) in DMAc, a high RH (e.g., >65%) resulted in fibers that have very few defects and smooth surfaces but larger diameters. A defect in a fiber is in general seen as a deviation from a smooth round fiber of long length. Defects thus are beads on the fiber, variations in fiber diameter in the axial direction, etc. One practiced in the art of fiber spinning will know this. A low RH (e.g., <13%), resulted in smaller fibers but more defects. Modestly low RH (e.g., 40% to 20%) typically produced small fiber size with fewer defects.

A variety of mechanisms are suitable in the present invention to control the chamber RH such as placing materials that absorb (e.g. calcium sulfate) or emit water moisture (e.g., hydrogels), operating a small humidifier in the chamber, and adding moisture into the process gas streams 26 prior to introduction to the electrospinning chamber. For example, positive results were obtained by bubbling $CO_2$ through deionized (DI) water and then introducing the humidified $CO_2$ gas into the chamber. In one embodiment of the present invention, two gas streams (e.g., one humidified and one dry) are used to obtain a desired RH for the chamber and/or for the gas jacket flowing over the electrospinning orifice.

In another embodiment of the present invention, RH and electrospinning conditions are used to vary the fiber diameter as a function of time thus providing for the creation of a nanofiber mat that varies in fiber diameter in the thickness direction of the mat.

Various embodiments of the present invention to prepare nanofibers use 21 wt % PSu ($M_w$~35,000 g/mol) in N,N-dimethylacetamide (DMAC) solution with the solution containing 0.2 wt.% of the surfactant TBAC, which lowers the surface tension and raises the ionic conductivity and dielectric constant of the solution. The above-noted polymer solution was spun from a 30 G (ID≅0.1524 mm) stainless steel needle with a flow rate of 0.05 ml/hr of the polymer solution to the stainless steel needle, a gap of 25.4 cm between the needle and the collector was set, an applied potential of 29.5 kV DC was used, a $CO_2$ gas jacket flow rate of 6.5 L/min was used, and RH was controlled to be in the range of 22 to 38%. Inspection by SEM indicated an average fiber diameter (AFD) of 82±35 nm with the smallest fibers being in the 30 to 40 nm range. FIG. 4 is a scanning electron micrograph (SEM) of these PSu fibers.

In one embodiment of the present invention, a PSu solution composed of 21 wt % polymer and 0.2 wt % TBAC was spun from a 0.1524 mm ID Teflon capillary tube with a flow rate of 0.05 ml/hr, a $CO_2$ flow rate of 8 lpm a gap of 25.4 cm, and a potential of 121 kV/m. This condition obtained an AFD of 81±49 nm. The large variance in the AFD indicates the diversity of fiber sizes including some very small fibers less than 50 nm.

In yet another example of the present invention, polycarbonate PC was spun from a 15 wt % solution of polymer in a 50/50 solution of tetrahydrofuran (THF) and N,N-dimethyl formamide (DMF) with 0.06 wt % TBAC. A 30 G stainless steel needle, a polymer solution flow rate of 0.5 ml/hr, and a $CO_2$ flow rate of 8 lpm were used with a gap of 25.4 cm and applied potential of 25 kV to obtain sub 200 nm fibers.

Inspection by SEM indicated an AFD of 150±31 nm with the smallest fibers being around 100 nm.

The fiber diameter obtained in the present invention is a function of the polymer molecular weight, the polymer architecture, the solvent or solvents, the concentration of polymer in the solvent system, the additives and their concentration, the applied electrospinning potential, the gap between the spinning orifice and ground, the size and shape of the spinning orifice, the polymer solution flow rate, the flow rate and composition of the process gas that flows over the needle, the RH of the process gas, and the partial pressure of the solvent(s). The examples given above were found favorable for obtaining fibers appropriate for nanofiber filter construction but are not restrictive.

Other embodiments of the present invention could use different polymer solvent systems and hence different electrospinning conditions to obtain appropriate nanofibers. Furthermore, the same polymer solvent systems could be combined with different electrospinning conditions to create improved fibers or fibers tailored for alternative applications. For example, the jacket of $CO_2$ gas flowing over the needle could contain solvent vapor in order to lower the evaporation rate of the solvent(s) in the polymer jet formed at the needle tip, thus increasing stretching time of the polymer fiber. The partial pressure of the solvent can also be modified via control of temperature, pressure, and mixture of solvents. In one embodiment of the present invention, the solvent concentration as determined by a relative concentration in the atmosphere is controlled to between 0 and 100%.

Yet another embodiment of the present invention pertains to control of the electrospinning environment and selection of the polymer(s) solvent(s) system provides the electrospun fibers to be deposited on the mesh or on themselves in a state in which the nanofibers are not completely dry of the solvent. Accordingly, the fibers can then bond to the mesh and/or bond to each other forming an integral mesh/fiber filter structure.

The nanofibers produced by the present invention include, but are not limited to, acrylonitrile/butadiene copolymer, cellulose, cellulose acetate, chitosan, collagen, DNA, fibrinogen, fibronectin, nylon, poly(acrylic acid), poly(chloro styrene), poly(dimethyl siloxane), poly(ether imide), poly(ether sulfone), poly(ethyl acrylate), poly(ethyl vinyl acetate), poly(ethyl-co-vinyl acetate), poly(ethylene oxide), poly(ethylene terephthalate), poly(lactic acid-co-glycolic acid), poly(methacrylic acid) salt, poly(methyl methacrylate), poly(methyl styrene), poly(styrene sulfonic acid) salt, poly(styrene sulfonyl fluoride), poly(styrene-co-acrylonitrile), poly(styrene-co-butadiene), poly(styrene-co-divinyl benzene), poly(vinyl acetate), poly(vinyl alcohol), poly(vinyl chloride), poly(vinylidene fluoride), polyacrylamide, polyacrylonitrile, polyamide, polyaniline, polybenzimidazole, polycaprolactone, polycarbonate, poly(dimethylsiloxane-co-polyethyleneoxide), poly(etheretherketone), polyethylene, polyethyleneimine, polyimide, polyisoprene, polylactide, polypropylene, polystyrene, polysulfone, polyurethane, poly(vinylpyrrolidone), poly(2-hydroxy ethyl methacrylate) (PHEMA), gelatin, proteins, SEBS copolymer, silk (natural or synthetically derived), and styrene/isoprene copolymer.

Additionally, polymer blends can also be produced as long as the two or more polymers are soluble in a common solvent or mixed solvent system. A few examples would be: poly(vinylidene fluoride)-blend-poly(methyl methacrylate), polystyrene-blend-poly(vinylmethylether), poly(methyl methacrylate)-blend-poly(ethyleneoxide), poly(hydroxypropyl methacrylate)-blend poly(vinylpyrrolidone), poly(hydroxybutyrate)-blend-poly(ethylene oxide), protein blend-polyethyleneoxide, polylactide-blend-polyvinylpyrrolidone, polystyrene-blend-polyester, polyester-blend-poly(hyroxyethyl methacraylate), poly(ethylene oxide)-blend poly(methyl methacrylate), poly(hydroxystyrene)-blend-poly(ethylene oxide)).

Other embodiments of the present invention include the use of polymers that are pH and/or thermal responsive such that the nanofiber mat can later be modified, respond to a change in environment, or easily dissolved. Example polymers include the commercial pH sensitive polymers know as Eudragit polymers as well as copolymers of N-isopropyl acrylamide (NIPAM) and N-methyacryloy-L-Leucine (MALEU) or (N,N-dimethylamino)ethyl methacrylate (DMAEMA). A similar approach would be to use polymers that are easily degraded with enzymes such as Chitosan which is degraded by Chitosanase and cellulose which is degraded by α-cellulase. Combinations of polymer systems could be used to tune the nanofiber filter mat properties to the particular application.

Although one method of the present invention includes the use of an enclosure 1 and process gas 26, an alternate embodiment includes an open ventilated system (e.g., fume hood) in lieu of enclosure 1. In yet another embodiment, the process gas 26 can be omitted.

Filter Support Mesh

In addition to obtaining nanofibers having few defects and a close distribution in fiber diameter sizes, the construction of support 7 and preparation of the surface of the support affect the resultant fiber mat and the resultant filter properties. In one embodiment of the present invention, a macroscopic mesh provides adequate support for the nanofibers to withstand the forces exerted on filter mat during filtration. The support mesh contributes minimally to pressure drop of the resultant filter. The coarse mesh aspect of the present invention is an alternative approach to using the conventional filter media as the nanofiber support.

Filters formed with meshes that contained 1.27 cm, 0.635 cm, or 0.159 cm (i.e., American Engineering standard sizes: ½", ¼" and 1/16" respectively) openings using copper, brass, nickel, stainless steel, and aluminum metal are suitable for the present invention. Aluminum window screen with openings about 1.2 mm×1.6 mm is also an acceptable support. The surface of the metal mesh, especially for aluminum meshes, was subjected to cleaning to remove dirt and oils followed by washing the mesh in diluted sulfuric acid (10 to 20% $H_2SO_4$ in DI water by volume) to remove resistive oxides and impurities. This cleaning improved nanofiber dispersion and adhesion. Any number of metals or metal alloys, with openings of various shapes (square, rectangle, circular, diamond, oblong and odd shaped), with openings ranging in size from about 12.7 mm down to 1000 times the AFD can be used in the present invention.

Adhesion of the nanofibers to the support mesh in one embodiment of the present invention is improved via the application of an adhesive to the mesh directly prior to electrospinning. The adhesive typically is a slow drying adhesive permitting the adhesive to be tacky (i.e., adhesive) when electrospun fibers are deposited. Alternately, in another embodiment the wires (or components) of the mesh can be coated with a very thin layer of polymer that has surface groups which interact (van der Waals, hydrogen-bond, dipole, electrostatic attraction, etc.) with the polymer fibers being deposited on the mesh. One example system is a thin coating of poly(glycidyl methacrylate) (PGMA) on nickel mesh with nanofibers of poly(methyl methacrylate) (PMMA) deposited on the coated mesh. An alternate embodiment of the present invention uses cross linkable systems that are polymerized after the fibers are deposited. Examples include chitosan nanofibers crosslinked with glutaraldehyde and polyvinyl acetate crosslinked with borax; also, deposition of nanofibers on adhesives such as Norland's line of curable adhesives based on mercapto-ester compounds. These surface coatings increase adherence and adhesion of the nanofibers to the support.

In another embodiment of the present invention, the metal mesh is replaced with metal foams such as ERG's Duocel™ metal foams; for example, Aluminum Durocel with 20 pores per inch (PPI; alternately an average pore size of 1.27 mm). Foams can also be made with copper, nickel, and various other metallic as well as polymeric materials. Porosities ranging from 10 PPI (2.5 mm pores) to 40 PPI (0.064 mm pores) are acceptable for the invention.

In one embodiment of the present invention, aluminum parts (or other metals that oxidize) are treated to prevent formation of aluminum oxides (metal oxides), for example using the process known as "Electroless Nickel" or electroplating with gold.

In yet another embodiment of the present invention, the support mesh is composed of a plastic that is conductive. For example polyester or nylon screen (or coarse nonwoven polymer mesh) is coated with a conductive finish such as gold, palladium, or various metal alloys. The coating process can be achieved by any number of established arts including vacuum deposition (e.g., sputter coating, evaporation deposition, and chemical vapor deposition), and chrome plating of plastics. Alternately, the mesh can be composed of conductive plastic that obtains its conductivity via embedded conductive particles (carbon nanotubes, metals etc.); or, any method to make plastic mesh conductive, semi-conductive, or electrostatic dissipating.

In one embodiment of the present invention, a nonwoven support that is conductive or made conductive (e.g., sputter coating etc., as mentioned above) is used. The nonwoven support will make a larger contribution to the pressure drop but may be acceptable in certain applications. This embodiment is similar to existing art but differs in that firstly a conductive nonwoven is used and secondly—and most importantly—the structure of the electric fields and electric potential of the support is controlled differently versus existing art as detailed later in this document.

In one embodiment of the present invention, utilizing the advantageous properties of the high FoM nanofiber mats (described later), nanofibers of the present invention are deposited on a substrate of conventional filter media, which is supported by the metal mesh during spinning. The layered nanofiber conventional filter media thus created can be later removed from the mesh and pleated, bonded into bags, and used in related conventional fabrication techniques for making various filter products. This embodiment is similar to existing art but allows control of the structure of the electric fields and electric potential of the support mesh is controlled differently versus existing art to make media with FoM greater than 20 kPa$^{-1}$ as detailed later in this document. Additionally, due to the nature of electrospinning, the fibers could be spun directly onto a pleated filter or other filter product (e.g. bag filter) providing for enhancement of a low efficiency filter. One such example would apply a layer of nanofibers to a pleated general ventilation filter which would improve removal of allergens (pollen, endotoxins, etc) or biotoxins (endotoxins, spoors, infections agents, etc.).

In one embodiment of the present invention, polymers may be selected to dissolve in water, pH and/or regulated buffer solutions, degraded by heating to above room temperature, or degraded by enzymes to facilitate recovery of particles or bioaerosols for subsequent analysis, in the case where the nanofiber mat is used for sampling.

Filter Fabrication and Nanofiber Mat Morphology

As mentioned above, one way to assess filter performance and compare different filters is to use figure of merit (FoM) comparisons. The FoM is a fundamental measure of a filter that allows comparison of filters of different thicknesses to be compared; the greater the FoM the better the filter.

Figure 5:
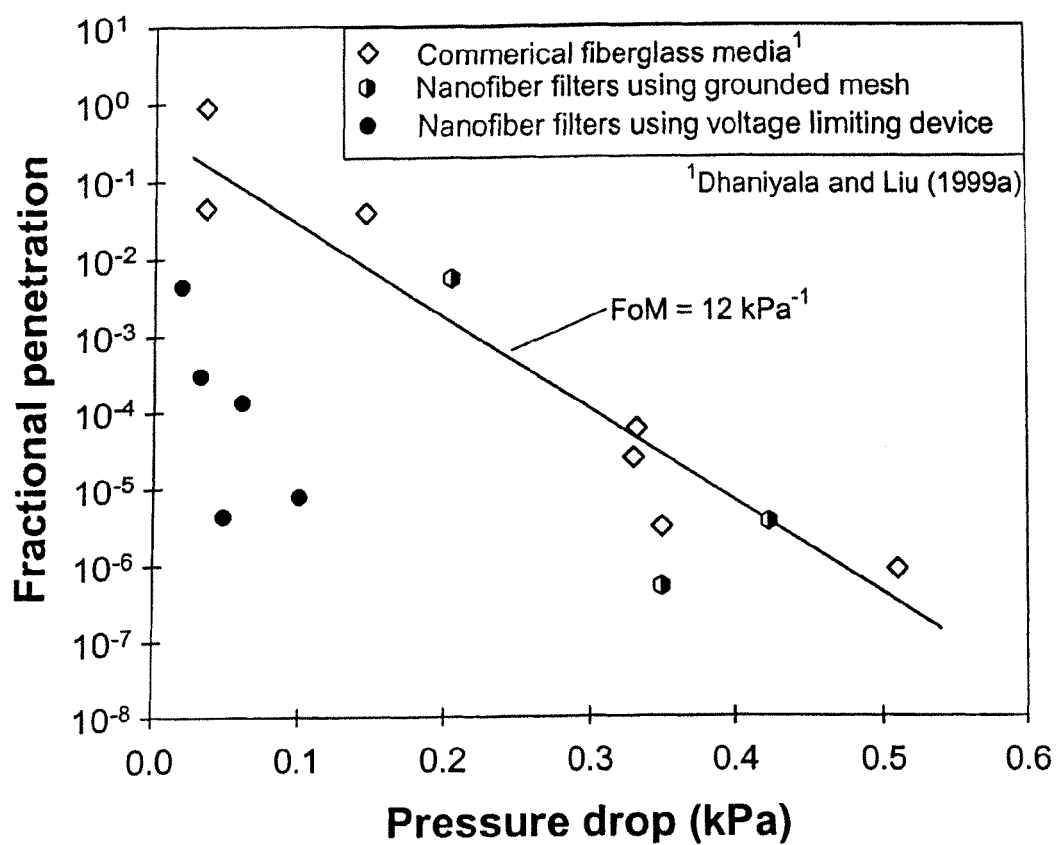
FIG. 5 is data for particle fractional penetration as a function of pressure drop from conventional filter media compared to filter media made using embodiments of this present invention.

Fundamentally, the FoM is a ratio of the individual fiber collection efficiency normalized by the individual fiber aerodynamic drag. A simple way (but not necessarily the only way) to understand FoM is as follows: if one takes two identical filters and place them in series, the efficiency of the system increases, but the pressure drop increases as well because the thickness was doubled. Therefore, the FoM stays constant. A particularly interesting aspect of fibrous filters and FoM is that the majority of commercial fibrous filter media all have similar FoMs. FIG. 5 demonstrates this phenomenon, in part, showing that data of fractional penetration versus pressure drop from various commercial fiberglass filters (open diamonds) all fall along a diagonal line; this line is FoM. A FoM of about 12±2 kPa$^{-1}$ for 0.3 μm particles at a face velocity of 5.33 cm/s describes the performance of nearly all fibrous fiberglass media over a wide range of efficiencies.

Theoretically, the FoM depends on the fiber diameter and a packing density of the filter. For a packing density of 0.09 and a fiber diameter of 10 nm (potentially a lower limit for practical spinning of fibers), the FoM is computed to be 720 kPa$^{-1}$ for 0.3 μm particles at 5.3 cm/s. These computations were based on equations for pressure drop and particle collection reported by Payet et al (1992) and Thomas et al (1992) incorporated by reference.

Although modeling of filter FoM as a function of fiber diameter predicts marked improvement of filter performance with decreasing fiber diameter, this improvement has not been realized. In prior work, filters have been formed by electrospinning nanofibers on grounded supports or substrate (e.g., low efficiency cellulose filter media) sitting on a grounded surface. However large enhancement in FoM were not observed, that is the FoM obtained was less than 12 kPa$^{-1}$ for 0.3 μm particles at 5.3 cm/s. Therefore, using electrospun nanofibers to obtain high efficiency filters with improvement over existing technologies is not straightforward and has not been heretofore realized.

Filters made by electrospinning nanofibers onto grounded supports are shown in FIG. 5 as the half-filled hexagons. These results, obtained during the development of the present invention represent what is possible by prior art. Literature values for high efficiency nanofiber filters tested by ASTM standard F1215-89 (or related filter test standards), while not readily given in the literature, are comparable to or much worse than the values depicted in FIG. 5 (i.e., typical values of FoM<<12 kPa$^{-1}$ for 0.3 μm particles at 5.3 cm/s).

Producing a nanofiber filter with improved performance over existing technology involves typically both sub 200 nm fibers and appropriate filter mat morphology (e.g., area-wide uniformity and fibers having a variance in average fiber diameter that is comparable to the average fiber diameter). Obtaining a filter mat morphology suitable for a high FoM filter involves factors such as the thickness of the nanofiber filtration layers, the packing density of the fibers, the average fiber diameter, and the range and population of fiber diameters. The electrospinning techniques described above for obtaining sub 200 nm fibers in combination with selection of a support mesh that contributes minimally to the pressure drop (compared to the contribution due to the nanofiber mat) are a part of the improved nanofiber filters of the present invention.

Filter FoM can also be affected, in part, by leaks at component interfaces, mat uniformity across the entire support mesh, and mat morphology (fiber packing density, fiber diameter, etc.). In one embodiment of the present invention, fabrication of a filter (or filter media) may involve the attachment of the coarse mesh 7 to a supporting frame 6. One issue is selection of an attachment scheme that prevents the formation of leaks at the mesh/frame interface due to inadequate deposition of the nanofibers. In one embodiment of the present invention, an adhesive is used. In this embodiment, fibers are deposited under similar conditions as used for nanofiber deposition on a plain support mesh, but the presence of an adhesive improves sealing of the nanofiber mat to frame. In another embodiment, the interface is sealed or further sealed with an adhesive that is compatible with the polymer nanofibers (adheres to the polymer nanofibers, mesh, and frame without dissolving the nanofibers) such that a weakened nanofiber/adhesive interface is not formed.

Various adhesives such as a silicone rubber, epoxies, and high voltage electrical tape as sealing means have been used in the present invention. A combination of the adhesive dielectric strength and the surface properties of the adhesive (surface chemical groups and charge) determine how the electrospun nanofibers interact with the adhesives. Polystyrene and PSu fibers were found to readily deposit on common epoxy adhesives while they were less likely to deposit on common silicon adhesives such as Electric Products, Inc.'s Plumber's Goop™ and Dow Corning's RTV™. The smallest amount of fiber deposition was found for Plumber's Goop and 3 M high voltage electrical tape.

In one embodiment of the present invention, epoxy (e.g., Loctite™ Epoxy gel) is applied to ensure good coverage of PSu nanofibers at the interface of the support mesh and the frame. In another embodiment of the present invention, this same epoxy is used after electrospinning PSu to seal leaks and thin spots. Other embodiments that use polymer(s) different from PSu would require selection of adhesive such that adhesive/polymer nanofiber compatibility is maintained.

In another embodiment of the present invention, adhesives are selected to minimize fiber deposition in certain areas of a filter geometry. For example a combination of mesh shape and voltage potentials along with adhesives that have low or high fiber deposition properties could be used to create complex two or three dimensional patterns of nanofibers.

Although various embodiments include the support mesh being attached to a frame, other embodiments of the present invention do not require a frame supporting the mesh.

Both floating and grounded support meshes (e.g., element 7 in FIG. 2B and FIG. 3) were used in development of the present invention. With an electrically floating mesh, the fibers that were initially deposited had a more uniform dispersion than those deposited on directly grounded meshes. However, as fibers are deposited on the mesh, the mesh potential quickly rises with time thus reducing the electrical potential difference between the electrospinning needle (orifice 2) and the target (the support mesh 7) which drives the process. In fact, the voltage potential on the mesh can rise to the point that the electrospinning process stops.

Accordingly, in one embodiment of the present invention, a voltage discharge device or a voltage limited device (VLD) is provided which regulates the mesh potential as a function of time. These devices are examples of the above noted electric field pulsation device. Methods for controlling the voltage of the mesh/forming nanofiber mat include, for example, a spark gap device or voltage discharge tube. Once the mesh/mat reaches a limiting value, charge is removed. The VLD thus prevents stoppage of the electrospinning process.

One embodiment of the VLD of the present invention is a spark gap device, i.e., element 9 in FIG. 2B and in FIG. 3, which was formed by folding excess support mesh under the plane of the support mesh where the fibers will be deposited. The distance between the tips of the wires to the ground plate 41 below them was about 3.5 mm. The voltage at which discharge occurs is the dielectric breakdown voltage, which is controlled by the gap distance (e.g., 3.5 mm) and the dielectric breakdown voltage of the gas in the electrospinning chamber. The dielectric breakdown voltage of the gas is determined by the gas composition and environmental conditions (i.e., RH and temperature).

The support mesh potential varies with time as determined by the VLD 9 and electrospinning conditions. This time varying potential is beneficial in the production of high FoM filters. FIG. 6 provides an example of the support mesh potential and the discharge current/VLD current as a function of time. The mesh potential was measured using a high impedance probe; discharge current was measured across a resistor positioned in series between the ground plate system and earth ground. For an applied spinning potential of 29.5 kV, the arithmetic average of the mesh 7 potential was about 5.7 kV and the frequency of discharge was 5.3±1.0 Hz, the peak voltage was around 10 kV. The time varying mesh potential and its average value are exemplified by FIG. 6 but not restricted to these values. Other frequencies and potentials are suitable for the present invention. Indeed, in one embodiment of the present invention, layers of nanofibers are deposited in the presence of a periodic discharge to ground. In another embodiment of the present invention, layers of nanofibers are deposited in the presence of an applied electric field pulsation.

In one embodiment of the present invention, the abruptly varying waveform produces fiber mats with improved filtration properties, as measured by the resultant FoM values obtained. The exact mechanism or mechanisms for the improved performance are not certain at this time. Potential sources of improvement could include changes in fiber density, changes in the three-dimensional structure of the filter mat, improved fiber morphology, and improved distribution of the fibers on the support structure (e.g., mesh).

This route of fiber fabrication using abrupt electric field modulation could be applied in other embodiments of the present invention to the fabrication of nanofibers, nanofiber yarns, nanofiber nonwovens, and other nanofiber structures for a variety of applications beyond the forming of filtration media and devices.

The present invention is not limited to the exact abrupt transitions shown in FIG. 6. Nevertheless, the transitions in FIG. 6 represent an illustrative example. The abrupt discharge events seemed to typically take 16 ms to discharge 10 kV. However, these numbers are not fixed even for the transitions shown in FIG. 6. Similarly, the charging time back to the 10 kV was around 200 ms but also varied from cycle to cycle.

In one embodiment of the present invention, the applied waveforms or the charging events (for example up to 15 000 V or 50% of applied voltage) can take from 100 ms to 1 sec with 200 ms being typical. Discharging events or abrupt transitions to a near zero electric field potential can occur quickly, for example taking 2 ms to 80 ms with 16 ms being typical. The values and waveforms shown in FIG. 6 are taken to be representative abrupt transitions that can be used, according to various embodiments of the present invention to produce fiber mats for various nanofiber applications.

A number of methods for controlling the mesh potential with a VLD are possible in the present invention. A spark gap device can be used that is not an integrated part of the support as shown in FIG. 2B, but rather simply connects to the filter mesh. This gap can be carefully controlled using a micrometer like device. The gap can also be dynamically controlled, that is the time varying potential of the mesh is monitored and gap size adjusted to actively control the mesh potential behavior to a desired value. The VLD can be any number of devices that sets a defined voltage or time-varying wave form such as gas discharge tubes (e.g. SRC's voltage limiting gas discharge tubes), miniature neon lamps, switches, or other electronic components or systems that either actively or passively regulate the voltage of the mesh as a function of time.

Embodiments of the present invention include VLD and electrospinning conditions such that frequency can range up to 1000 Hz and the average mesh/mat potential can range from 0 V to 15 000 V or 0 to 50% of the voltage applied to the electrospinning orifice. Other embodiment of the present invention can apply similar voltage waveforms at these magnitudes and frequencies.

In addition to the electrical potential of the support mesh 7, the shape (or structure) of the electric fields were important to the fiber formation process. While the mesh 7 is kept at a regulated voltage potential the presence, location, and shape of grounded metallic electrodes were important. While circular or cylindrical components have been used, other geometries are possible.

In one embodiment, a ground plate 41 was positioned at a set distance below the mesh 7 in order to provide sufficient potential difference and shape of the electric fields needed to obtain adequate electrospinning and deposition of the fibers on the mesh. In another embodiment of the present invention, a second ground plate 43 was positioned below the support frame 6 with some amount of the metal ground plate extending beyond the side of the frame 6. This further helps to maintain adequate electrospinning potential and electric field shape to promote deposition of the fibers onto the mesh, including to the top edge of the filter frame 6.

In one embodiment of the present invention, a mesh 7 to internal ground plate 41 distance of 5 mm with a spark gap 9 distance 3.5 mm, an outside edge of lower ground plate 43 to side of filter frame 6 distance of 7 mm, and a distance from 43 to 41 of 69 mm provided for good nanofiber and mat morphology. Other embodiments include the distance between 43 and 41 being reduced or even 43 being eliminated. In a related embodiment, the distance is maintained, but a removable spacer may be used such that a very thin filter structure is created (frame+mesh+nanofiber mat≤1 cm; and frame+mesh+nanofiber mat≤0.5 cm). The height of element 42 would typically be constant and a spacer would replace the frame 6. That is frame 6 would be in two parts, a spacer used during electrospinning and the actual frame supporting the mesh 7 would be thin. Alternately, frame 6 and element 42 could be made shorter. The distance between mesh 7 and ground plate 41 can range from 0.5 mm to 10 mm, the spark gap can range from near 0 mm to 10 mm, and the distance from side of 6 to outside edge of 43 can vary from 0 to 10 cm.

In another embodiment of the present invention, a gas discharge tube or other VLD is used such that no gap distance is specified/used; however, the filter assembly and ground plate system is as just described above.

In one embodiment of the present invention, no voltage limiting device is used—the mesh 7 is connected to ground but the ground plate system 41-43 is the same. This configuration provides for a very high efficiency filter (i.e., a particle penetration Pt<$10^{-6}$) but with a reduced FoM.

In one embodiment of the present invention, a conductive, semi-conductive, or insulating nonwoven support is placed on top of a system with a voltage limiting device and ground plate system, such that the potential of the nonwoven is modulated and the electric fields are shaped/maintained in much the same way as the embodiment above with the mesh. In one variation, nonwoven media is supported on a conductive metal mesh. The resulting layered media could be removed from the metal mesh and used in conventional filter fabrication processes providing a composite filter in which the nanofiber layers provide a high efficiency particle trap and the conventional filter media provides a supplemental filtration media as for particles larger than a micron. HEPA filters can also be used as the supplemental filtration media.

One alternate approach is for the nanofibers to be on the upstream side of the nonwoven with the nonwoven simply providing structural support. Optionally, there could be a double-sided media, i.e. nanofibers/nonwoven/nanofibers.

RH was also found to affect deposited nanofiber mat morphology (already mentioned above was the effect on fiber morphology). Higher RH resulted in fibers being deposited in stronger registry with the wires of the mesh while lower humidity gave more uniform dispersion of fibers across the mesh openings. For the PSu example already mentioned, an RH in the range of 38% to 22% tended to yield better fiber morphology. The RH control technology is the same as mentioned above in the discussion of forming nanofibers.

Further improvements in nanofiber mat uniformity were obtained by moving the electrospinning orifice 2 and/or the filter frame assembly 6 during fiber deposition. In one embodiment of the present invention, the filter frame 6 was placed off center from the spinning jet and the frame rotated during fiber deposition. For example, the 8.89 cm OD filter frame and the spinning orifice were positioned axially but with the spinning orifice offset from center by 2.22 cm. The filter frame was then rotated 90 degrees clockwise every 7 minutes, other time intervals from every 30 seconds to every 10 minutes were used in other embodiments of the invention. Alternatively, an automated system could continuously or periodically rotate the filter frame. For the embodiments where a shape other than circular is used, the frame and/or spinning jet is translated in an x-y fashion rastering across the filter mesh repeatedly until finished. Other embodiments, regardless of filter geometry, include movement of the emitter and mesh relative to each other using motion in the x, y, and z directions along with rotation and tilt in order to obtain desired coverage of the mesh.

The thickness of the nanofiber mat can vary from about 0.25 µm (250 nm) to 500 µm or beyond if needed, where most filters had an average mat thickness in the range of 2 to 5 microns. The average mat thickness numbers represent the average thickness of the total nanofiber mat in a filter. Alternately the mat thickness can be defined as layers of nanofibers with the thickness including from 4 to 4000 layers where 4 to 400, or 5 to 100, or 5 to 15 layers were typical in various embodiments.

Determination of how long to electrospin, in order to obtain a desired fiber mat thickness, pressure drop, and/or filter efficiency, was done primarily via real-time monitoring of the pressure drop of the forming filter. Process gas 26 flows through the forming filter mat and out the only active exhaust 28 during electrospinning. A differential pressure gauge 32 measured the total pressure drop across the filter at the face velocity of the process gas flowing through the forming filter. There is a direct relationship between this measured pressure drop and that observed when the finished filter is tested/used at a particular face velocity (e.g., 5.3 cm/s). There is also a relationship between the pressure measured by differential pressure gauge 32 and the mat thickness and density. In one embodiment of the present invention, pressure drop was used to determine how long to electrospin to obtain a filter with a FoM above 20 kPa$^{-1}$.

In another embodiment, time alone is used to determine when to stop electrospinning given the direct relationship between electrospinning duration (time) and fiber mat density and thickness.

EXAMPLE 1

Standard aluminum window screen was cleaned with alcohol, rinsed with DI water, cleaned with acetone, rinsed with DI water, dried, and then cleaned with dilute (14 vol. %) sulfuric acid, thoroughly rinsed with DI water, and then dried with clean, dry nitrogen gas. An 8.89 cm diameter circle of the cleaned mesh was attached to a 7.7 cm long piece of 7.62 ID PVC pipe with some of the edges of the mesh folded under (9). The mesh was attached to the PVC frame with Locktite™ Epoxy gel. The mesh 7 frame 6 assembly was placed on the ground plate system 28, 41-43 inside the electrospinning enclosure 1. The distance between 7 and 41 was about 8 mm, the spark gap device 9 had a gap of about 5 mm. The side of 6 to outside edge of 43 was 7 mm (determines area of lower ground plate 43 that helps shape and maintain the electric field between emitter 2 and filter assembly). A mixture of dry and wetted (via bubbling through DI water) $CO_2$ 26 was used to obtain an RH in the range of 26 to 38%.

21 wt % PSu (Udel P3500 LCD by Solvay Advanced Polymers) in DMAC with the 0.2 wt.% TBAC was used as the polymer solution. This polymer solution was spun from a 30 G (ID~0.152 mm) stainless steel needle with a flow rate of 0.05 ml/hr, a gap of 25.4 cm, an applied potential of 29.5 kV DC, and a $CO_2$ gas jacket flow rate of 8 L/min.

The filter frame assembly was rotated 90° clockwise every 7 minutes for a total of 50 minutes. The resulting pressure drop of the finished filter was 53.9 Pa at a face velocity of 5.3 cm/s. The filter had a FoM of about 85 kPa$^{-1}$ for 0.3 μm particles at 5.3 cm/s, after two weeks of aging in a clean, dry storage area.

EXAMPLE 2

The same aluminum mesh and filter frame configuration from Example 1 was used but a spark gap 9 of 3.5 mm was used with a mesh 7 to 41 distance of 5 mm. The RH was regulated to be in the range of 33 to 26%. The rest of the conditions and configurations were identical to Example 1. The filter was rotated 45° every 5 minutes for a total of 45 minutes to produce a filter with a pressure drop of 48.8 Pa and a penetration Pt of $1.7 \times 10^{-5}$, that is a FoM of about 98 kPa$^{-1}$.

Comparative Example

Example three is similar to the first example except the support mesh is placed in intimate contact with 41 thus providing for a grounded mesh instead of using a voltage limiting device. An orifice to mesh gap of 16.83 cm was used with the rest of the dimensions for the ground plate system the same. The same polymer solution was used with the same size stainless steel needle and applied spinning voltage. Electrospinning of the filter was performed for about 34 minutes. The resulting filter has a pressure drop of 448 Pa. The particle penetration Pt was difficult to measure but estimated to be less than $5 \times 10^{-7}$, which yields an estimate for FoM of about 14 kPa$^{-1}$. Although the filter structure formed by grounding the mesh does not provide for a high FoM filter, it does provide for a very high efficiency (better than HEPA) filter for a pressure drop comparable to HEPA filters.

Filters with Improved Performance

The present invention in one embodiment permits filters having a plurality of nanofibers disposed on a support mesh to form filtration medium having figures of merit greater than 20 kPa$^{-1}$ for average fiber diameters of the nanofibers less than 200 nm. The present invention in one embodiment permits filters having a FoM greater than 40 kPa$^{-1}$ for average fiber diameters of the nanofibers less than 100 nm to be realized.

Figure 7:
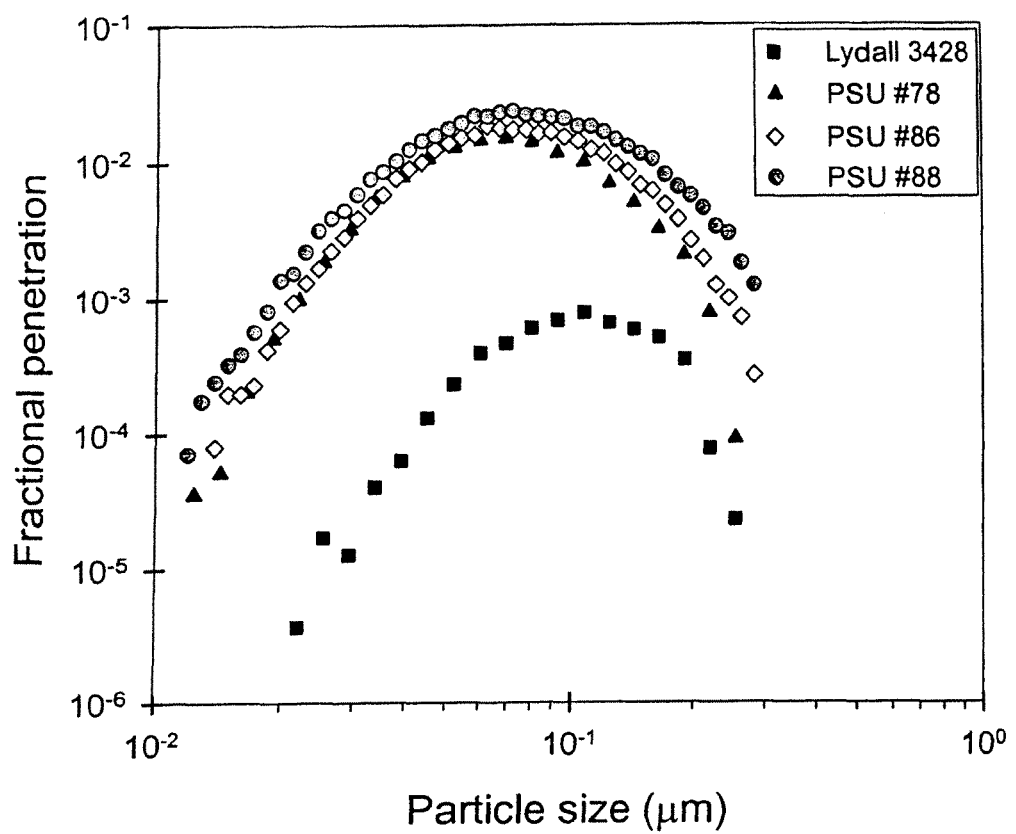
FIG. 7 is data for particle penetration as a function of particle size for conventional filter media compared to filter media made using embodiments of this present invention in order to demonstrate improvement in most penetrating particle size.

Another improvement obtained versus current fiberglass HEPA filter media is a reduction in the diameter of the most penetrating particle size. The most penetrating point is the size range where the filter is the least efficient (the most particles get through). For conventional fiberglass HEPA media this size is in the range of 0.1 to 0.3 μm, where for our nanofiber filters with an AFD around 82 nm the most penetrating size is around 0.07 μm as shown in FIG. 7.

The present invention is not restricted to a most penetrating size of 0.07 μm; the data merely demonstrate that an improvement over existing art is obtained by the practice of this invention. It is important to note that the HEPA filter shown has a pressure drop of about 330 Pa (at 5.3 cm/s face velocity) while the nanofiber filters have pressure drops of about 48 Pa. A nanofiber filter with the same maximum particle penetration as the HEPA filter would have a pressure drop of 86 Pa with no change in the most penetrating particle size.

Monitoring and Feed Back Control of Nanofiber Mat

As mentioned above filter mat thickness and uniformity influence the properties of the resultant filter. From FIG. 1, step 103 includes control of the electrospinning process. Uneven filter mat density produces areas that carry more than their share of the gas flow and have less than average filtration efficiency. Monitoring of nanofiber mat density, thickness, and uniformity along with filter efficiency is possible using some additional innovations.

Light scattering techniques in one embodiment of the present invention is used to measure mat density and uniformity. Although the average fiber diameter (AFD), in some embodiments of the invention, is 100 nm or less, there are a few fibers in the 200 to 250 nm size range. A red laser with a wavelength around 650 nm has been demonstrated to scatter sufficient light from the mat to detect differences in mat thickness. Scattering from a representative population of fibers as opposed to scattering from the total population of fibers is advantageous in some embodiments of the invention.

However, in the case of where fiber diameters and numbers are too small for a red laser, or more scattering information is required, then shorter wavelength lasers are now readily available, such as a blue 405 nm laser. This blue laser would have a diffraction limit of about 101 nm, which is within one-sigma of the AFD for even the smallest nanofibers used to make filter mats. In one embodiment of the invention light scattering from the fiber mat is used to determine the stopping point for electrospinning. Other embodiments provided for in-place quality assurance (QA) of the filter and monitoring of the mat uniformity.

In another embodiment of the present invention, the laser light scattering and an automated system, which moves the spinning orifice and filter frame relative to each other, are linked in a microprocessor controlled system. The deposition of the fibers is monitored and controlled real-time in order to achieve improved nanofiber mat uniformity and to obtain the correct mat thickness and density. Other embodiments of the present invention include incorporating this control system with real-time pressure drop testing and aerosol testing (discussed below).

Another embodiment of the present invention dealing with monitoring filter efficiency and determining stopping point or performing in-place QA, is using a test aerosol to measure the filter performance. The outlet 28 in FIG. 2B can be connected to an aerosol instrument 30, which is capable of analyzing the composition of the output gas. The gas introduced at the inlet 26B may include test aerosol particles to test the efficiency of the formed filter. With the arrangement shown in FIG. 2B, the production of the filter including electrospun fibers is monitored for its performance online, i.e., by analyzing in real-time with the aerosol instrument 30 the amount of aerosol particles removed by the filter while it is being fabricated. Thus, in one embodiment of the present invention, a manufacturer can set a threshold for the amount of particles (e.g., as a percentage of particles) that should be removed by the filter from the ambient and the electrospinning of the fibers is stopped when that threshold is achieved. In this way, the production of the filter is efficient, in the sense that no material and time is wasted to form the filter. This real time monitoring of the production process of the filter will only marginally contaminate the filter with the test particles.

In another embodiment of the present invention concerning testing the forming filter with aerosol, an isokinetic probe, which is connected to the aerosol instrument 30, is scanned over the underside area of the filter thus providing for local testing of the filter in order to find leaks or thin spots. An isokinetic probe, as known in the art, involves matching the air velocity within the probe to the ambient air velocity, thereby minimizing particle size dependent sampling errors from particle inertia. In situations where small particles (e.g., less than 200 nm) are measured, the sampling errors from particle inertia are usually small and anisokinetic sampling (the flow velocities are not identical) may be used. In some embodiments of the present invention anisokinetic probes could be used. Similar to the light scattering embodiment, a control system would direct the position of the electrospinning orifice relative to the forming filter mat based on test results of the scanning probe/aerosol instrument.

Alternate Filter Shapes and Configurations

Although initially demonstrated with flat 7.62 cm circular filters, other embodiments of the present invention include square, rectangular, tubular, and odd or novel shaped filter frames of various sizes for a wide range of nanofiber mat applications. There is little restriction on the size (cross sectional area) of the filter devices, ranging from very small (nostril sized on the order of 1 cm in diameter) to very large (building and clean room filters on the order of 2 ft by 2 ft and larger).

Figure 8:
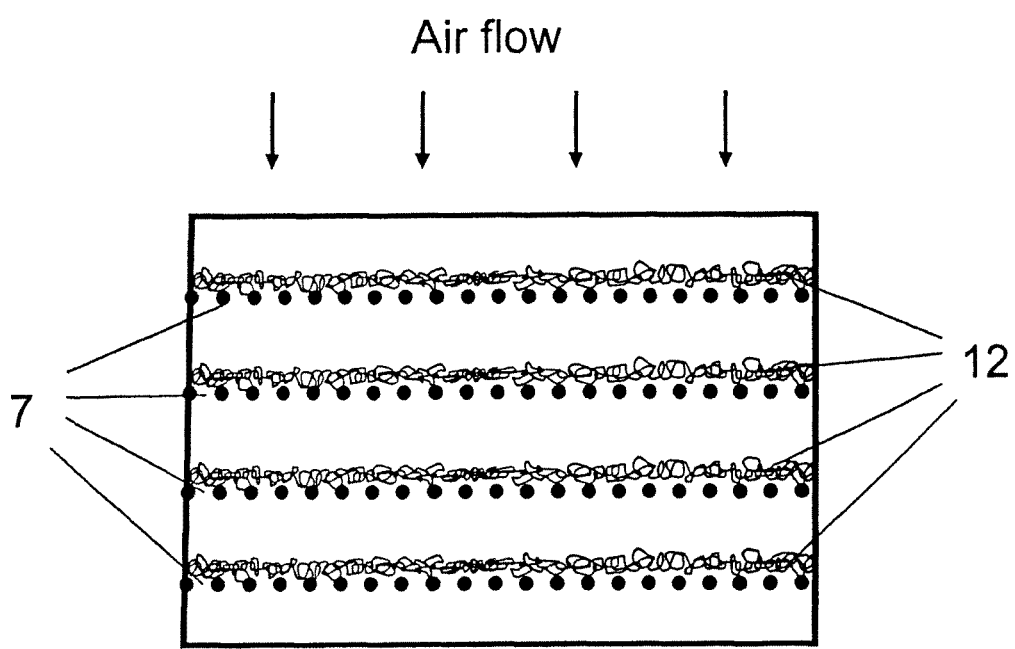
FIG. 8 is a schematic depicting one embodiment of the present invention in which multiple nanofiber/mesh stacks are used.

FIG. 8 shows another embodiment of the present invention in which a filter having an extended depth is formed from multiple nanofiber/mesh stacks. As shown in FIG. 8, multiple layers or stages of electrospun nanonfiber mats 12 on mesh supports 7 (formed individually) can be stacked on each other to provide multiple stages of filtration or redundant filtration. In related embodiments, the polymer composition and/or AFD used to make each stage of the stacked filter is varied. An example use of this includes a variation in filter efficiency with each stage such that the first stage is a coarse filter and the final stage is high efficiency. In another example of this embodiment, the stages have different functions, for example the first stage removes particles while subsequent stages contain fibers with reactive, absorptive, and/or catalytic properties for removing or neutralizing toxic or hazardous chemicals (e.g., Sarin gas).

Figure 9:
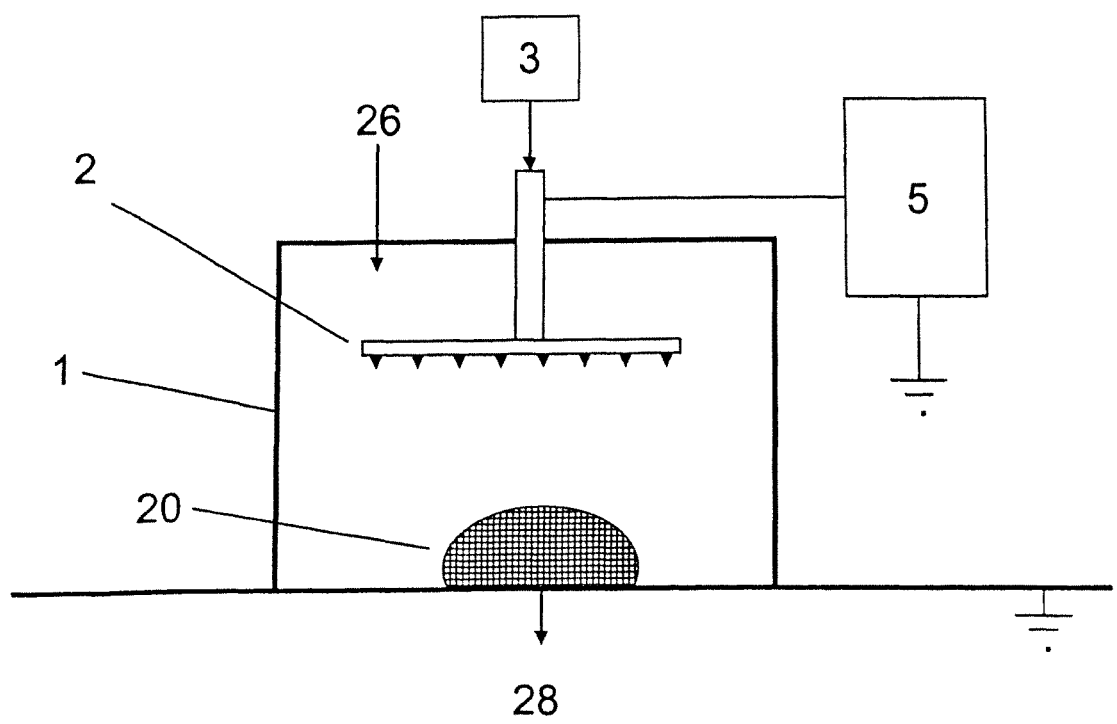
FIG. 9 is a schematic of a shaped filter unit and a device for making the shaped filter unit according to one embodiment of the present invention.

FIG. 9 shows a similar arrangement as in FIG. 2A but the mesh support 20 has, in this embodiment of the present invention, the shape of a product device; such as for example a respirator for filtering inhaled air. For example, the mesh support 20 could have the shape of a respirator cartridge filter (e.g., a "top hat" shape) according to one embodiment of the present invention. A variety of shapes can be envisioned that can be produced due to the ability of the electrospun nanofiber mat to conform to the support mesh used. For the embodiment of producing shaped filter mats, the mesh and emitter are moved relative to each other in the x, y, and z directions in addition to rotation and tilt (e.g., placing the mesh and filter holder system on a gimbal).

The high pressure drop of conventional media is typically mitigated by increasing the surface area of filter media present in a particular cross sectional area of a filter device. The media is pleated to obtain an extended area filter. With the present invention a number approaches of producing extended area filters are possible. In one embodiment of the invention for producing extended area filters, nanofiber filter media on support mesh is fabricated and then the nanofiber mats/meshes are assembled into "V" structures. In yet another embodiment an extended area structure is formed by the support mesh and the nanofibers are then directly spun onto this extended area structure.

Figure 10A:
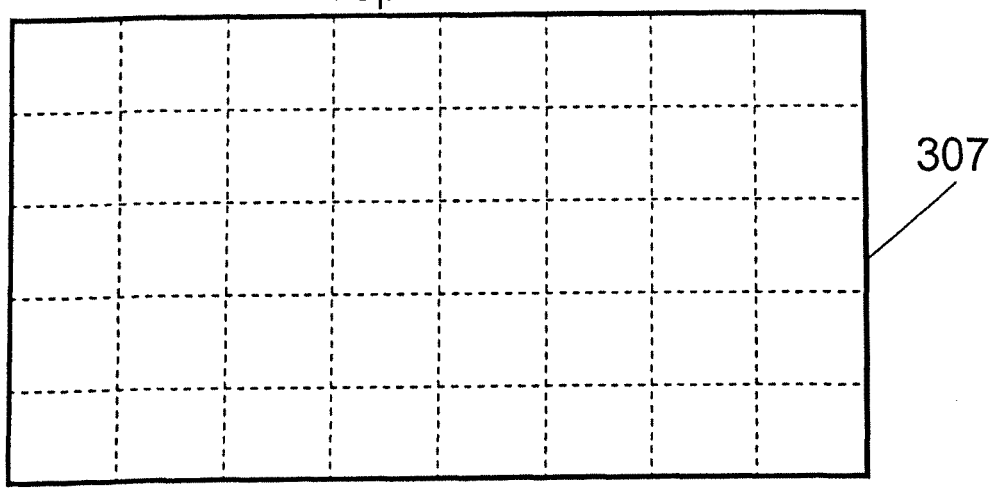
FIGS. 10A and 10B are schematics depicting a top view and a side view of a filter frame and mesh according to one embodiment of the present invention.
Figure 10B:
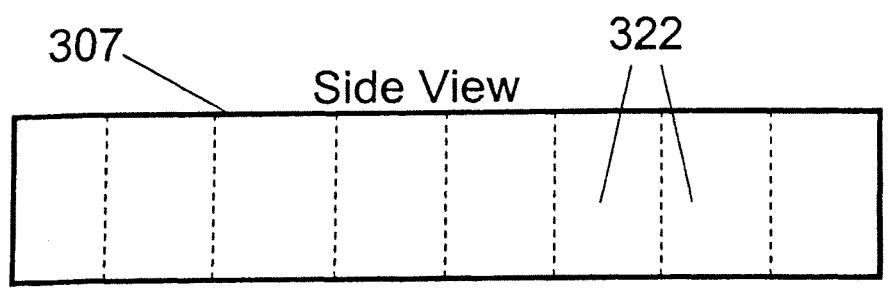
Figure 11:
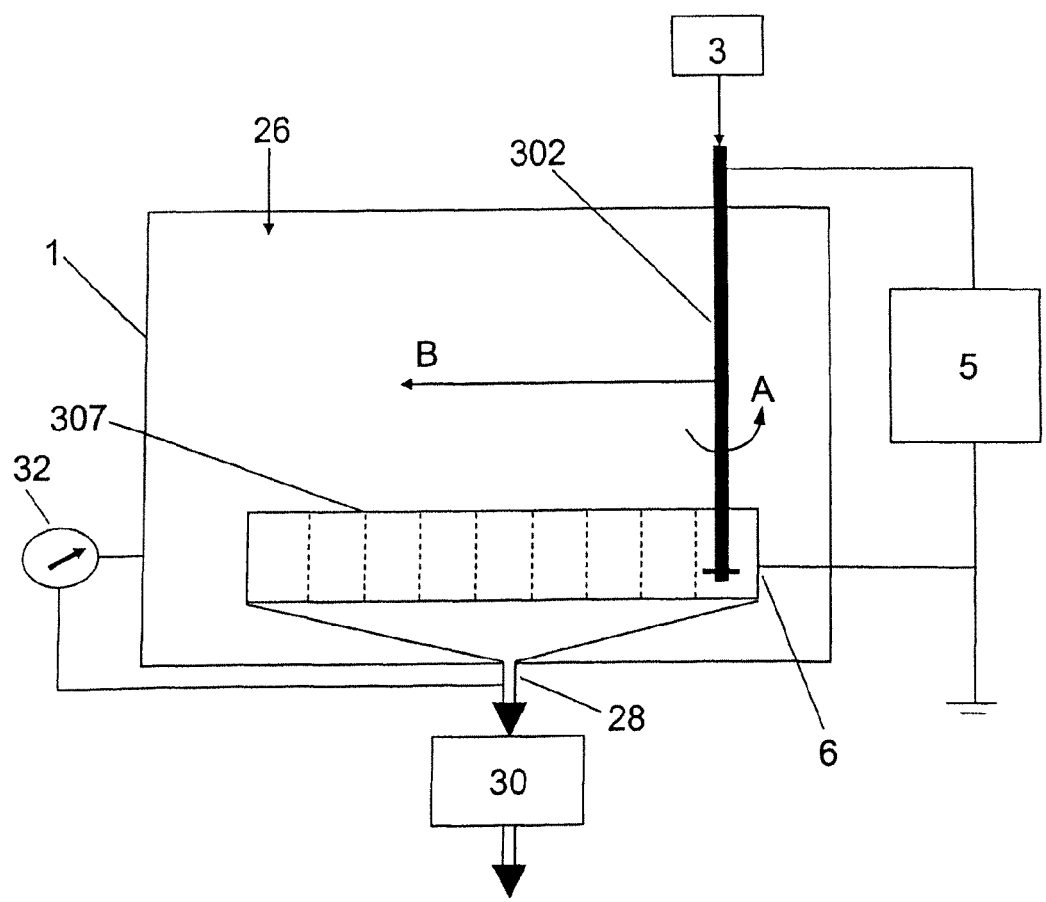
FIG. 11 is a schematic of a filter making device, according to another embodiment of the present invention, having a rotating head.
Figure 12:
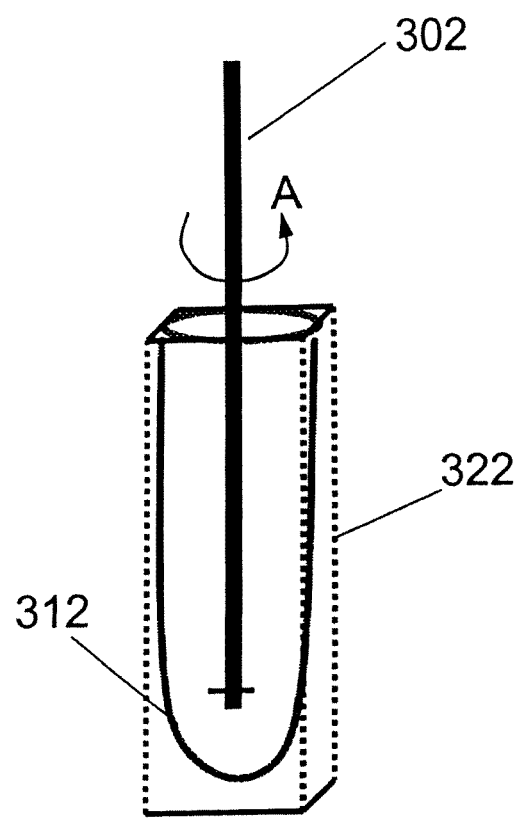
FIG. 12 is a schematic of a cell of a filter made with the device of FIG. 10.

A filter constructed of multiple cells with the fibers electrospun into each cell as shown in FIGS. 10, 11, and 12 is yet another embodiment pertaining to producing extended area filters. As seen in FIG. 10B from a side view, the mesh 307 defines cells 322 in which nanofibers can be radially electrospun.

FIG. 11 shows the frame 6 of FIGS. 10A-10B placed in the enclosure 1. FIG. 11 also shows schematically a control system for operating an electrospinning system of the present invention. Specifically, a controller (not shown) receives input from various test devices such as particle detector 30 and differential pressure gauge 32 in order to control translation of emitter 302 in the lateral direction above a collector of the electrospun fibers and/or to control the amount of time that emitter 302 resides in each cell 307. The enclosure 1 also houses the emitter 302, which has a similar function but different shape from the emitter 2 of FIG. 2A. While depicted in FIG. 10 for the purpose of a more complete explanation, controller 10 can be used for example to control the lateral and/or vertical position of emitter 2 in FIG. 2A.

The emitter 302 might be, for example, the rotating head disclosed in U.S. application Ser. No. 10/819,916 the entire contents consists of which are incorporated herein by reference. Alternately, the emitter could have multiple orifices providing fibers in all directions; or, a combination of rotation and multiple orifices is used. The emitter 302 may be capable of (i) rotation as shown by arrow A, and (ii) movement along direction B. Also, the emitter 302 is capable of moving along a vertical direction in the enclosure 1. The emitter 302 is connected to the power supply 5 and the frame 6 is optionally connected to ground.

In one embodiment of the present invention, the rotating emitter 302 is inserted in each cell 322 to electrospin the fibers 312 on the mesh 307. After fibers 312 are formed on a cell, the emitter 302 moves to the next cell with the help of a moving mechanism (not shown). This motion may be automatically controlled by a microprocessor. The mesh 307 may be electrically conductive. The cells may have a bottom formed from a sheet of wire mesh. The frame 6 may be impermeable to air and may be constructed of wood, metal or plastic for example. Areas of the frame and mesh may be coated with an adhesive as will be appreciated by one of ordinary skill in the art to aid in the bonding of the electrospun fibers. A multiplicity of emitters 302 may be used to increase throughput. A face of the filter may include an array of circular tubular cavities spun with fibers or nanofibers.

FIG. 12 shows a single cell 322 in which an electrospinning element 302 is inserted. Some of the fibers 312 will not reach the side wall of the mesh 7 but will form a layer of fibers that will form the bottom of the cell 322. The same process may happen at the top of the cell 322, thus forming a closed cavity of fibers 312. In some cases, a nonrotating emitter may be needed for the bottom of the cell.

Filter Loading

In the art of filtration one pervasive problem is that filters load with dust or become fouled resulting in the pressure drop across the filter becoming too large. The filter must then be replaced or cleaned. Some embodiments of the present invention address this problem by providing a pre-filter for dust.

Figure 13:
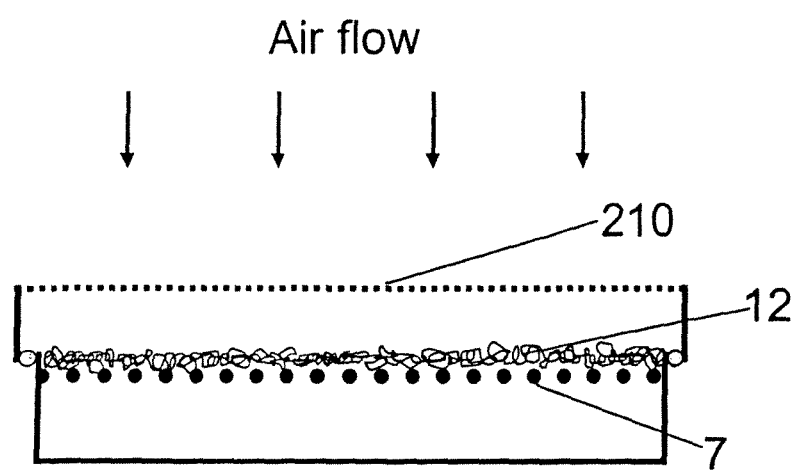
FIG. 13 is a schematic of a nanofiber filter device, according to one embodiment of the invention, with a coarse prefilter composed of conventional filter media.

In one embodiment of the present invention (see FIG. 13), a pre-filter composed of conventional media 210 can be arranged in front of the electrospun fibers 12 in a direction of an air flow. The conventional media provides a first layer of course filtering, removing dust and large particles or potential foulants, while the nanofiber based media provides high efficiency filtration (thorough removal of smaller size particles). For example, a snap on disposable coarse dust filter is placed in front of the nanofiber filter; as the coarse filter clogs with large particles it is easily replaced while the nanofiber filter provides continuous high efficiency filtration of small particles. This arrangement would extend lifetime of the nanofiber filter and provide for a high FoM filtration system.

Various Methods of the Present Invention

Returning now to a general discussion of the processes in FIG. 1A, FIG. 1A illustrates a method according to one embodiment of the present invention for forming a fiber mat. At 100, a support having openings for fluid flow therethrough is provided. At 102, fibers are electrospun across an entirety of the macroscopic openings to form a plurality of layers providing a filtration medium in which particles entering the layers are filtered from the fluid flow. Nanofibers having an average fiber diameter less than 200 nm, as shown in FIGS. 1A and 4, are particularly suited for high FoM filtration. In one particular embodiment of the present invention, at 102, an electric field is pulsed at the collector at least once during electrospinning of the fibers to discharge charges accumulated on the electrospun fibers. The pulsation can come from one of the above-described voltage discharge devices or can be externally impressed. For example, in one embodiment of the present invention, a time varying waveform (similar to that shown in FIG. 6) can be impressed on the support. Waveforms such as square waves and sawtooth waves are also appropriate for the present invention.

At 100, the support can be a conductive mesh. An adhesive can be applied to a perimeter of the support to seal the perimeter from particle by-pass of the filter. The conductive mesh can be treated and coated to promote adhesion of nanofibers to the mesh. The support in one embodiment of the present invention is incorporated into the filter.

As such, a filtration medium of the present invention can include a number of support media ranging from rigid structures with macroscopic openings to high efficiency particulate air (HEPA) filter medium. As such, the present invention permits in one embodiment the formation of a high performance filter by electrospinning nanofibers directly onto existing lower efficiency medium such as conventional residential and commercial building filters having a minimum efficiency reporting value (MERV) ranging from 3-12.

MERV ratings are determined for general ventialtion filters as described in ASHRAE Standard 52.2 (1999). A potassium chloride aerosol (KCl) challenge is used to obtain particle size dependent efficiency over a wide range of particle diameters. Pressure drop and filter efficiency are the two main criteria when testing a filter. The determination of pressure drop is a function of gas flow rate while the measurement of filter efficiency at the rated flow rate is a function of particle diameter from 0.3 to 10 μm. The initial efficiency as a function of particle diameter is determined with the KCl aerosol and an Optical Particle Counter. The efficiency is determined with the following steps. The efficiency of the clean filter is measured. Then, a conditioning step with ASHRAE dust is conducted to simulate atmospheric exposure to particles on permanently charged filters and the resulting reduction in efficiency. The efficiency as a function of particle diameter measurement with KCl aerosol and OPC(s) is repeated. The filter is then loaded with ASHRAE dust in 4 different increments followed by efficiency as a function of particle diameter measurements using the KCl aerosol and OPC(s). The final dust loading will cause the pressure drop in the filter to match the manufacturers stated pressure drop limit. The minimum efficiency reporting value (MERV) is determined by first computing the average of the minimum efficiency observed in the three particle size ranges 0.3 to 1, 1.0 to 3.0 and 3.0 to 10.0 μm. A standard table in ASHRAE (1999) is used to look up the MERV corresponding to the minimum efficiencies.

In other applications of the preset invention, the nanofibers would be electrospun onto the filter media used in making pleated filters and other engineered filter units. Such an approach for example would be one practical way to form an improved filter in which the nanofiber coated filter media would be then pleated and formed into a conventional-shaped HEPA filter unit for installation into standard air handlers. In another example HEPA media could be coated with nanofibers to produce filters with previously unreachable efficiencies (>99.9999%) with tractable pressure drops.

In another embodiment of the present invention, the support for deposition of the fiber mats of the present invention can be removed or dissolved from the deposited fiber mat, permitting the fiber mat to be transferred to another filtration medium such as for example a conventional filter medium, a plastic foam, a metallic foam, a semi-conductive foam, a woven material, a non-woven material, a plastic screen, and a high efficiency particulate air (HEPA) filter.

The mesh is typically conductive but could be insulating when used in conjunction with a conducting frame during electrospinning. The support can have conical shaped support, a circular shaped support, a planar shaped support, a spherical shaped support, or a cylindrical shaped support. The support can be shaped as a mold such as for example to fit a respirator cartridge. The support can include multiple cellular frames arranged adjacent to each other. As such, electrospinning in each frame provides a mechanism for obtaining a larger area filter with suitable particle entrapment and filtration in each frame.

At 102, the electrospinning can form nanofiber layers with respective ones of the nanofibers in one layer integrally attached to other nanofibers in an adjacent layer. The electrospinning can electrospin a solution including a polymer dissolved in the solution, e.g., having a concentration of 1 to 50 wt % in the solution in some embodiments and 17 to 30 wt % in the solution in other embodiments. Electrospinning can also be performed with molten polymers. The polymer can have a molecular weight of 20,000 to 2,000,000 g/mol. Alternative polymer concentrations and polymer weights can be mixed with appropriate solvents and used for the electrospinning process.

The electrospun nanofibers can have an average fiber diameter of less than 500 nm, or less than 200 nm, or less than 100 nm, depending on the specific electrospinning conditions employed, as shown above. The electrospinning can electrospin first nanofibers having a first average fiber diameter; and thereafter electrospin on the first nanofibers second nanofibers having a second average fiber diameter smaller than the first average diameter. In this manner, a progressively finer mesh of the nanofiber filter mat is obtained. The electrospinning can electrospin first nanofibers having a first average fiber diameter; and thereafter electrospin on the first nanofibers second nanofibers having a second average fiber diameter larger than the first average diameter. In this manner, a progressively larger mesh of the nanofiber filter mat is obtained. At 102, the electrospinning can form between 4 to 4000 (or 10 to 100) layers of nanofibers.

Further, the resultant fiber mat (with or without the support) can be provided with a filtration medium disposed adjacent to the fiber mat or the support. The base filtration provides coarse filtration of particles (e.g., filtration of particles larger than 1 micron). Alternatively, the method can assemble plural of the supports, with respective ones of the supports including the nanofiber layers, thereby providing multi-stage filtration.

At 102, a controlled atmosphere for the electrospinning can be provided by controlling a humidity or solvent concentration in the atmosphere. The humidity can be controlled to a relative humidity less than 100% or in some embodiments between 5% and 65%, or in other embodiments between 15 and 40%. The solvent concentration can be controlled less than a saturation amount to a relative concentration (e.g., partial pressure) between 10 and 80% of the atmosphere in the enclosure and more specifically between 20 and 45%. At 102, the electrospinning can electrospin a pH sensitive polymer substance, thereby permitting in some cases dissolution of the electrospun fibers after particle entrapment. At 102, the electrospinning can electrospin a thermally sensitive polymer substance or an enzyme sensitive polymer substance, also permitting in some cases dissolution of the electrospun fibers after particle entrapment.

At 102, the electrospinning can provide an additive including at least one of a salt and a surfactant to a substance to be electrospun. The additive can be supplied at a concentration of 0.01 to 10% or higher and in various embodiments at a concentration from 0.06 to 0.2 wt %. At 102, uniformity of fiber deposition is improved by generally moving the electrospinning element (i.e., a spinneret) and support relative to each other.

At 103, the electrospinning can detect an amount of gas or aerosol passing through a portion of the filter being tested, and translate the electrospinning element or provide relative motion between the electrospinning element and the collector in response to a result of the detecting. The above noted light scattering techniques can also be used for the detection of mat uniformity.

Furthermore, the dynamic electrospinning technique illustrated herein for the electrospinning of nanofibers can be used for electrospinning of fibers and for electrospraying of liquids (i.e., electric-field extracted) to form droplets, solid particle residue and/or ionized components from the electric-field extracted substance.

Other Application Areas

The resultant nanofiber mat, prepared by any and all of the methods described above, can be removed from the support for other filter or non-filter applications. For example, the plurality of nanofiber layers can be removed from the support; and thereafter attached to a conventional filter medium, a plastic foam, a metallic foam, a semi-conductive foam, a woven material, a nonwoven material, a plastic screen, and a high efficiency particulate air (HEPA) filter. Alternatively, the removed nanofiber mat can be used in areas where nanofiber materials have been applied before such as for example catalysis, battery separators, wound dressing, supports for cell growth, and gas sensors to name a few.

The application of the nanofiber mat materials of the present invention would follow techniques similar to those as described in the references below, but would use the electrospinning techniques disclosed herein to produce the fiber mats of the present invention.

Various examples of these non-filter applications are given below.

In catalysis applications, the nanofiber mat materials of the present invention would be electrospun using polymers including catalytic metal particles (e.g., nanoparticulate metal and metal oxide nanoparticles) that would provide the mechanism for catalysis, similar to that described for example by Demir, M. M., M. A. Gulgun, et al., "Palladium nanoparticles by electrospinning from poly(acrylonitrile-co-acrylic acid)-PdCl2 solutions. Relations between preparation conditions, particle size, and catalytic activity," previously incorporated herein by reference. Further, as described in U.S. Ser. No. 11/130,269, these nanoparticles can be incorporated into the fibers of the fiber mat during electrospinning. Alternatively, these particles could be added to fibers (containing no particles as electrospun) during formation of the fiber mat, or added after formation of the fiber mat.

In one embodiment of the present invention, particles can be applied to the fiber mats after electrospinning. In this embodiment, a solution containing the particles is provided, and the nanofiber mat is immersed into the solution. The solution is selected such that the nanofiber mat does not dissolve but slightly swells the polymers existing in the nanofibers mat. This expansion of the fibers in the network expands the spaces between the fibers, thus opening the network spaces to allow the particles to move in between. Thus, the particles move to the fiber surface due to the Brownian motion. The fiber mat may be immersed in the solution for a period of 10 minutes to 72 hours and may be rinsed with constant solvent flow for 20-30 seconds to ensure the removal of any loosely attached surface particles. The fiber mat may then be placed onto a support and allowed to completely dry before use.

Owing to the small diameter of the nanofibers and the low resistance to fluid flow, the nanofiber mats of the present invention offer advantages over traditional catalyst media and prior art nanofiber-based catalyst materials described above in that the available surface area for catalytic reactions can be increased over the prior techniques. The inclusion of nanoparticulate metal and metal oxide nanoparticles in the nanofiber can yield a valuable catalytic material for industrial and biological processes.

Similarly, in battery separator applications, the nanofiber mat materials of the present invention would be electrospun using polymers that would be non-reactive with the battery solutions. Owing to the small diameter of the nanofibers and the low resistance to fluid flow, the nanofiber mats offer advantages over traditional battery separator media and prior art nanofiber-based battery separator materials, similar to that described for example by Choi, S. W., S. M. Jo, et al., "An electrospun poly(vinylidene fluoride) nanofibrous membrane and its battery applications," previously incorporated herein by reference, in that solutions for electrolytic reactions can more readily be transferred from anode to cathode through the fiber mats of the present invention.

Similarly, in wound dressings, the nanofiber mat materials of the present invention would be electrospun using biocompatible or biodegradable polymers to provide nanofiber mats which permit free exchange of gases. Further, similar to that described for example by Katti, D. S., K. W. Robinson, et al., "Bioresorbable nanofiber-based systems for wound healing and drug delivery: Optimization of fabrication parameters," previously incorporated herein by reference, nanofiber mats can retard the ingress of microbes into the wound surface. The fiber mats of the present invention can therefore be used as effective wound dressings, especially when added functionality such as haemostasis and controlled drug delivery is built into the structure. Further, as described in U.S. Ser. No. 11/130,269, nanoparticles can be incorporated into the fibers of the fiber mat during the fiber mat formatting or after fiber mat formation as described above. Such nanoparticles can be drug particles designed to release a drug as the fiber mat dissolves over time.

Similarly, in scaffolding for tissue engineering, the nanofiber mat materials of the present invention would be electrospun using biodegradable polymers to provide nanofiber mats which would be used to culture cells within the structure, similar to that described for example by Murugan, R. and S. Ramakrishna, "Nano-featured scaffolds for tissue engineering: A review of spinning methodologies," previously incorporated herein by reference. Once the cells have proliferated, the fiber mat scaffold would be surgically implanted in the body. The high surface area of nanofibers promotes cell attachment, and the high porosity of the construct allows exchange of gases and nutrients.

Similarly, in drug or bioactive material delivery applications, the nanofiber mat materials of the present invention would be electrospun using water soluble polymers to provide nanofiber mats which including the above-noted particles (now containing more generally bioactive substances) would be used to provide a controlled delivery of the bioactive substances, similar to that described for example by Jia, H. F., G. Y. Zhu, et al., "Enzyme-carrying polymeric nanofibers prepared via electrospinning for use as unique biocatalysts," previously incorporated herein by reference. Pharmaceuticals, especially those that are sparingly soluble in water can be delivered using nanofiber devices. The drug compound either dissolves or is distributed as fine particles in the polymer nanofiber matrix. Under physiological conditions, the bioactive agent is released either diffusively or via biodegradation of nanofiber matrix as described in various of the background references. Further, as described in U.S. Ser. No. 11/130,269, nanoparticle bioactive materials can be incorporated into the fibers of the fiber mat during the fiber mat formation, or after fiber mat formation as described above. Such nanoparticles can be drug particles designed to release a drug as the fiber mat dissolves over time.

Similarly, in nanofiber-based composite applications, the nanofiber mat materials of the present invention would be electrospun using polymers such as those described previously that would include carbon and inorganic nanofibers can be used as reinforcing inclusions in plastics formulations to improve their strength and durability, similar to that described for example by Chronakis, I. S. (2005), "Novel nanocomposites and nanoceramics based on polymer nanofibers using electrospinning process—A review.," previously incorporated herein by reference.

Similarly, in antibacterial nanofiber mats application, the nanofiber mat materials of the present invention would be electrospun using polymers such as those described previously that would additionally include photocatalytic compounds such as titania, similar to that described for example by Kenawy, E. R. and Y. R. Abdel-Fattah, "Antimicrobial properties of modified and electrospun poly(vinyl phenol)," previously incorporated herein by reference. Particles of the photocatalytic compounds could be included as discussed above by addition of particles of these photocatalytic compounds during formation of the fiber mat or after formation of the fiber mat. Exposure of the fiber mat to light in this application produces free-radical species that are biocidal. The same can also be achieved by dispersion of nanoparticles such as those of silver in the nanofibers. In this application, the electrospun fibers would be substantially transparent to the light permitting production of free radicals even in the interior to the fiber mat.

Similarly, in textile applications, electrospun nanofibers made by this technique would be deposited on conventional textile fabrics or incorporated as a component in a multilayered fabric construct. Inclusion of a nanofiber mat in a textile as a member will enhance the particle filtration effectiveness of the textile material. The nanofiber layer would not only serve as the most-effective filter layer in such a construct, but would also not impact 'breathability' of the material as nanofiber mats allow transport of air and moisture through the textile. This application area has interest not only from an environmental standpoint of protecting individuals from dermal exposure to particulates including nanoparticles, but also in military applications where dermal exposure to particles carrying biologically active materials or chemical agents need to be controlled.

Similarly, in sensor applications, the nanofiber mat materials of the present invention would be electrospun using polymers such as those described previously that would provide for large surface area nanofibers to be used in gas sensor applications similar to those described by Aussawasathien, D., J. H. Dong, et al. (2005). "Electrospun polymer nanofiber sensors," previously incorporated herein by reference.

In these non-filter applications, the fiber mats are attached to a support or detachable therefrom. As with the filter applications, the support can be the support used for production of the fiber mat or can be a detachable support permitting for example in the wound dressing application the removal of the support from the injury sites.

Numerous modifications and variations of the present invention are possible in light of the above teachings. It is therefore to be understood that within the scope of the appended claims, the invention may be practiced otherwise than as specifically described herein.

The invention claimed is:

1. A filtration device comprising:
   a filtration medium including a plurality of nanofibers having diameters less than 1 micron formed into a fiber mat; and
   an electrically conductive rigid support attached to the filtration medium and having macroscopic openings for fluid flow therethrough,
   wherein
   the nanofibers are deposited in a not completely dry state onto the rigid support, and
   the filtration medium has a figure of merit FoM=−Log(Pt)/ΔP, where Pt is the fractional penetration of an aerosol particle diameter of 0.3 microns and ΔP is a filtration medium pressure drop across the filtration medium corresponding to a face velocity of 5.3 cm/s, and said figure of merit is equal to or greater than 14 kPa$^{-1}$ and less than 98 kPa$^{-1}$.

2. The device of claim 1, wherein the rigid support has at least one of a conical shape, a curved shape, a circular shape, a planar shape, a spherical shape, and a cylindrical shape, and combinations thereof.

3. The device of claim 1, wherein the nanofibers are integrally attached one to another at points along respective ones of the nanofibers.

4. The device of claim 1, wherein the nanofibers have an average fiber diameter of less than 500 nm.

5. The device of claim 1, wherein the nanofibers have an average fiber diameter of less than 200 nm.

6. The device of claim 1, wherein the nanofibers have an average fiber diameter of less than 100 nm.

7. The device of claim 1, wherein the filtration medium comprises plural layers of oriented fibers.

8. The device of claim 1, wherein the nanofibers are deposited and bonded on the macroscopic openings of the support to form a mesh-fiber filter structure.

9. The device of claim 1, further comprising a supplemental filtration medium.

10. The device of claim 9, wherein the supplemental filtration layer provides filtration for particles larger than a micron in diameter.

11. The device of claim 1, further comprising:
plural supports, with respective ones of the supports including respective nanofiber layers to provide multi-stage filtration.

12. A filtration device comprising:
a filtration medium including a plurality of nanofibers having diameters less than 1 micron formed into a fiber mat; and
a support attached to the filtration medium and having macroscopic openings for fluid flow therethrough, wherein,
the filtration medium has a figure of merit FoM=−Log(Pt)/ΔP, where Pt is the fractional penetration of an aerosol particle diameter of 0.3 microns and ΔP is a filtration medium pressure drop across the filtration medium corresponding to a face velocity of 5.3 cm/s, and said figure of merit is equal to or greater than 14 kPa$^{-1}$ and less than 98 kPa$^{-1}$.

13. A filtration device comprising:
a filtration medium including a polymer-based material having microscopic openings; and
a support attached to the filtration medium and having macroscopic openings for fluid flow therethrough, wherein
the filtration medium has a figure of merit FoM=−Log(Pt)/ΔP, where Pt is the fractional penetration of an aerosol particle diameter of 0.3 microns and ΔP is a filtration medium pressure drop across the filtration medium corresponding to a face velocity of 5.3 cm/s, and said figure of merit is equal to or greater than 14 kPa$^{-1}$ and less than 98 kPa$^{-1}$.

14. The device of claim 13, wherein the figure of merit is equal to or greater than 20 kPa$^{-1}$.

15. The device of claim 13, wherein the figure of merit is equal to or greater than 50 kPa$^{-1}$.

16. The device of claim 13, wherein the polymer-based material comprises nanofibers in one layer integrally attached to other nanofibers in an adjacent layer of the filtration medium.

17. The device of claim 13, wherein the polymer-based material comprises a plurality of nanofibers having diameters less than 1 micron.

18. The device of claim 13, wherein the polymer-based material comprises network spaces to allow particles to move in between.

* * * * *